(12) United States Patent
Lim et al.

(10) Patent No.: US 12,236,133 B2
(45) Date of Patent: Feb. 25, 2025

(54) STORAGE DEVICE, OPERATING METHOD OF STORAGE DEVICE, AND ELECTRONIC DEVICE

(71) Applicant: SAMSUNG ELECTRONICS CO., LTD., Suwon-si (KR)

(72) Inventors: Jaehwan Lim, Seongnam-si (KR); Jae Eun Kim, Yongin-si (KR); Ji-Hoon Kim, Seoul (KR); Walter Jun, Seoul (KR); Jungwoo Lee, Hwaseong-si (KR); Seung-Woo Lim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 480 days.

(21) Appl. No.: 17/575,907

(22) Filed: Jan. 14, 2022

(65) Prior Publication Data

US 2023/0004324 A1    Jan. 5, 2023

(30) Foreign Application Priority Data

Jul. 1, 2021  (KR) .................. 10-2021-0086577

(51) Int. Cl.
*G06F 9/44*     (2018.01)
*G06F 3/06*     (2006.01)
*G06F 9/48*     (2006.01)

(52) U.S. Cl.
CPC .......... *G06F 3/0659* (2013.01); *G06F 3/0604* (2013.01); *G06F 3/0613* (2013.01); *G06F 3/0679* (2013.01); *G06F 9/4812* (2013.01)

(58) Field of Classification Search
CPC .................................................. G06F 3/0659

USPC ......................................................... 718/102
See application file for complete search history.

(56) References Cited

U.S. PATENT DOCUMENTS

| | | | |
|---|---|---|---|
| 7,082,390 B2 | 7/2006 | Bergsten | |
| 8,261,117 B2 | 9/2012 | Duvalsaint et al. | |
| 9,047,196 B2 | 6/2015 | Gounares | |
| 9,367,250 B2 | 6/2016 | Tressler et al. | |
| 9,459,904 B2 | 10/2016 | Mehta et al. | |
| 9,699,233 B1 | 7/2017 | Armorer et al. | |
| 10,515,014 B1* | 12/2019 | Himelstein | G06F 12/0813 |
| 10,705,879 B2 | 7/2020 | Oshins | |
| 2005/0071843 A1 | 3/2005 | Guo et al. | |
| 2010/0125715 A1 | 5/2010 | Takamatsu et al. | |
| 2011/0153893 A1 | 6/2011 | Foong et al. | |
| 2017/0068562 A1* | 3/2017 | Oshins | G06F 9/5088 |

FOREIGN PATENT DOCUMENTS

EP       1 760 591 A1     3/2007

OTHER PUBLICATIONS

"PCI Express® Base Specification Revision 5.0 Version 1.0", 5.0-1.0-PUB, PCI-SIG, May 22, 2019, 1299 pages total.

* cited by examiner

*Primary Examiner* — Timothy A Mudrick
(74) *Attorney, Agent, or Firm* — Sughrue Mion, PLLC

(57) ABSTRACT

A storage device includes a nonvolatile memory device and a storage controller. The storage controller accesses the nonvolatile memory device based on a request of an external host device. The storage controller sends a signal to the external host device, based a throughput of accessing the nonvolatile memory device being within a specific range.

20 Claims, 17 Drawing Sheets

STORAGE DEVICE, OPERATING METHOD OF STORAGE DEVICE, AND ELECTRONIC DEVICE

CROSS-REFERENCE TO RELATED APPLICATIONS

This application claims priority under 35 U.S.C. § 119 to Korean Patent Application No. 10-2021-0086577 filed on Jul. 1, 2021, in the Korean Intellectual Property Office, the disclosure of which is incorporated by reference herein in its entirety.

BACKGROUND

The present disclosure relates to an electronic device, and more particularly, relates to a storage device capable of improving performance of an electronic device implemented with multiple processors, an operating method of the storage device, and an electronic device.

An electronic device may be implemented with multiple processors. For example, an electronic device may be implemented to include two or more central processing units (CPUs). Alternatively, each of central processing units of an electronic device may be implemented to include two or more processor cores. Each of the multiple processors, whether CPUs or cores, may communicate with a peripheral device adjacent thereto and may communicate with a remote peripheral device through any other processor.

For example, a processor that is disposed adjacent to a specific peripheral device so as to directly access the specific peripheral device may be referred to as a local processor. A processor that is not disposed adjacent to the specific peripheral device and accesses the specific peripheral device through the local processor adjacent to the specific peripheral device may be referred to as a remote processor.

SUMMARY

It is an aspect to provide a storage device capable of improving throughput efficiency of the storage device, an operating method of the storage device, and an electronic device.

According to an aspect of one or more embodiments, there is provided a storage device comprising a nonvolatile memory device, and a storage controller that accesses the nonvolatile memory device based on a request of an external host device. The storage controller sends a signal to the external host device, based on a throughput of accessing the nonvolatile memory device being within a specific range.

According to another aspect of one or more embodiments, there is provided an operating method comprising accessing, at a storage controller, a nonvolatile memory device based on a request of an external host device; monitoring, at the storage controller, a throughput of accessing the nonvolatile memory device; and sending, from the storage controller, a signal to the external host device based on the throughput being within a specific range.

According to yet another aspect of one or more embodiments, there is provided an electronic device comprising a first processor group including a plurality of first processors; a second processor group including a plurality of second processors, the second processor group being configured to communicate with the first processor group; and a storage device connected with the second processor group, wherein the plurality of second processors directly access the storage device, wherein the plurality of first processors access the storage device through the plurality of second processors, and wherein, based on a throughput of the storage device being within a specific range, the storage device sends a signal to a processor that accesses the storage device from among the plurality of first processors and the plurality of second processors.

BRIEF DESCRIPTION OF THE FIGURES

The above and aspects will become apparent by describing in detail embodiments thereof with reference to the accompanying drawings, in which.

DETAILED DESCRIPTION

Below, various embodiments will be described in detail and clearly to such an extent that an ordinary one in the art easily implements the technical concept of the present disclosure.

Figure 1:
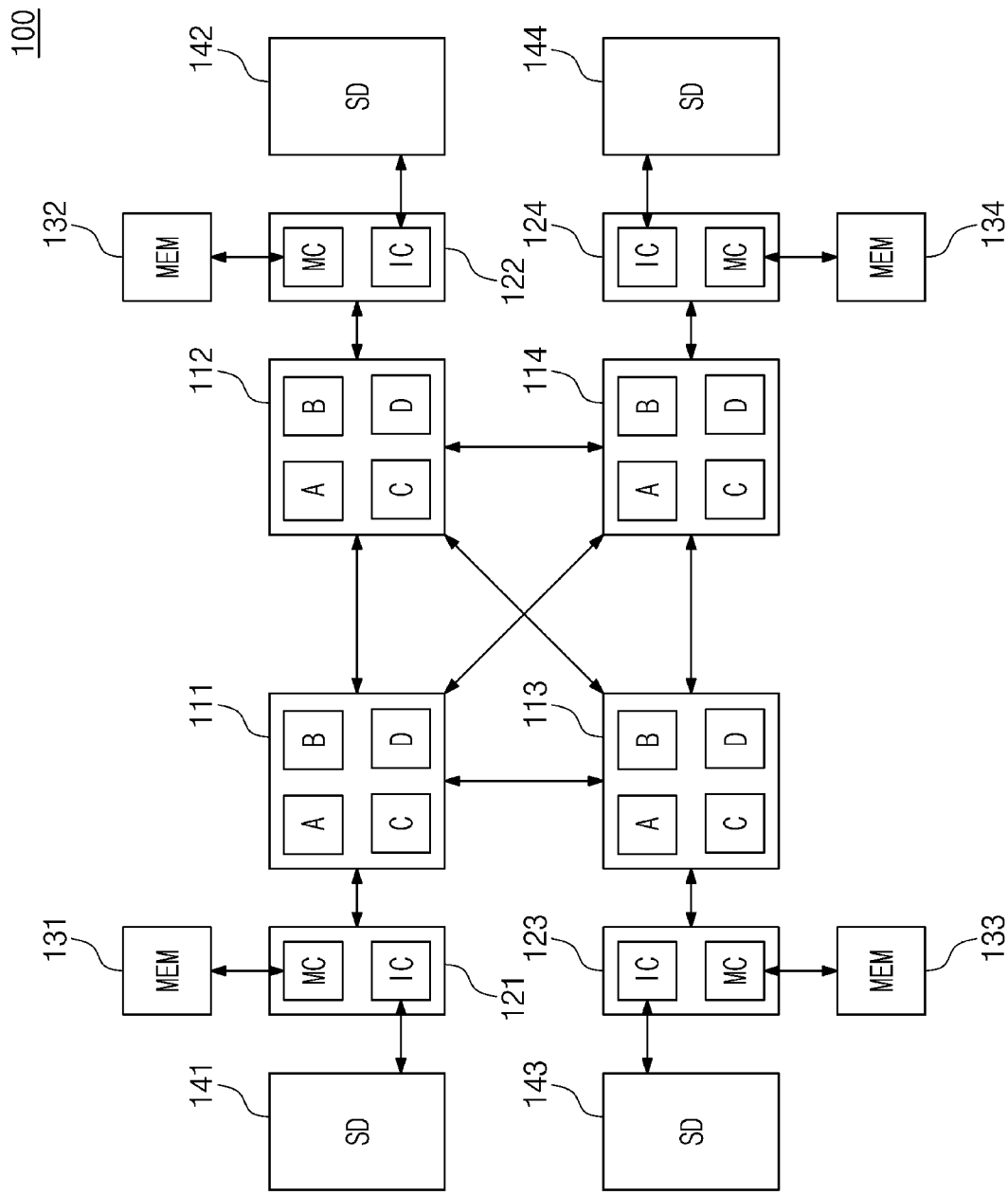
FIG. 1 illustrates an electronic device according to an embodiment.

FIG. 1 illustrates an electronic device 100 according to an embodiment.

Referring to FIG. 1, the electronic device 100 may include a first processor group 111, a second processor group 112, a third processor group 113, and a fourth processor group 114. Each of the first processor group 111, the second processor group 112, the third processor group 113, and the fourth processor group 114 may include a plurality of processors A, B, C, and D.

The electronic device 100 may include a first node 121, a second node 122, a third node 123, and a fourth node 124 corresponding to the first processor group 111, the second processor group 112, the third processor group 113, and the fourth processor group 114, respectively.

The first processor group 111 may be directly connected with the first node 121. In some embodiments, the processors A, B, C, and D of the first processor group 111 may be directly connected to the first node 121. The processors A, B, C, and D of the first processor group 111 may be local processors of the first node 121. The first node 121 may be a local node of the first processor group 111. The second processor group 112 may be directly connected with the second node 122. In some embodiments, the processors A, B, C, and D of the second processor group 112 may be directly connected to the second node 122. The processors A, B, C, and D of the second processor group 112 may be local processors of the second node 122. The second node 122 may be a local node of the second processor group 112.

The third processor group 113 may be directly connected with the third node 123. In some embodiments, the processors A, B, C, and D of the third processor group 113 may be directly connected to the third node 123. The processors A, B, C, and D of the third processor group 113 may be local processors of the third node 123. The third node 123 may be a local node of the third processor group 113. The fourth processor group 114 may be directly connected with the fourth node 124. In some embodiments, the processors A, B, C, and D of the fourth processor group 114 may be directly connected to the fourth node 124. The processors A, B, C, and D of the fourth processor group 114 may be local processors of the fourth node 124. The fourth node 124 may be a local node of the fourth processor group 114.

The first processor group 111 may access the second node 122, the third node 123, and the fourth node 124 through the second processor group 112, the third processor group 113, and the fourth processor group 114, respectively. In some embodiments, the processors A, B, C, and D of the first processor group 111 may access the second node 112, the third node 123, and the fourth node 124 through the second processor group 112, the third processor group 113, and the fourth processor group 114, respectively. The processors A, B, C, and D of the first processor group 111 may be remote processors of the second node 122, the third node 123, and the fourth node 124. The second node 122, the third node 123, and the fourth node 124 may be remote nodes of the first processor group 111.

As such, a node and processors that are directly connected to communicate with each other may be a local node and local processors. A node and processors that are connected through another processor group to communicate with each other may be a remote node and remote processors. Below, duplicated descriptions are omitted.

In an embodiment, the first processor group 111, the second processor group 112, the third processor group 113, and the fourth processor group 114 may communicate with each other based on ultra path interconnect (UPI).

The electronic device 100 may further include a first memory (MEM) 131, a second memory (MEM) 132, a third memory (MEM) 133, a fourth memory (MEM) 134, a first storage device (SD) 141, a second storage device (SD) 142, a third storage device (SD) 143, and a fourth storage device (SD) 144.

Each of the first memory 131, the second memory 132, the third memory 133, and the fourth memory 134 may include a random access memory such as a dynamic random access memory (DRAM), a phase-change RAM (PRAM), a magnetic RAM (MRAM), a ferroelectric RAM (FRAM), or a resistive RAM (RRAM).

Each of the first storage device 141, the second storage device 142, the third storage device 143, and the fourth storage device 144 may include a nonvolatile memory such as a flash memory, a phase-change memory, a ferroelectric memory, a magnetic memory, or a resistive memory.

The first node 121 may include a memory controller MC controlling the first memory 131 and an interface circuit IC communicating with the first storage device 141. The second node 122 may include a memory controller MC controlling the second memory 132 and an interface circuit IC communicating with the second storage device 142.

The third node 123 may include a memory controller MC controlling the third memory 133 and an interface circuit IC communicating with the third storage device 143. The fourth node 124 may include a memory controller MC controlling the fourth memory 134 and an interface circuit IC communicating with the fourth storage device 144.

In an embodiment, the memory controller MC of each of the first node 121, the second node 122, the third node 123, and the fourth node 124 may communicate with the corresponding memory of the first memory 131, the second memory 132, the third memory 133, and the fourth memory 134, respectively, based on the DDR SDRAM standard.

The interface circuit IC of each of the first node 121, the second node 122, the third node 123, and the fourth node 124 may communicate with the corresponding storage device of the first storage device 141, the second storage device 142, the third storage device 143, and the fourth storage device 144, respectively, based on the PCIe (Peripheral Component Interconnect express) or NVMe (Non-Volatile Memory express) standard.

In an embodiment, the electronic device 100 may be implemented based on Non-Uniform Memory Access (NUMA). A specific processor may locally access a local memory or a local storage device and may remotely access a remote memory or a remote storage device through any other processor group (or any other processors of any other processor group).

In an embodiment, like the first memory 131, the second memory 132, the third memory 133, the fourth memory 134, the first storage device 141, the second storage device 142, the third storage device 143, and the fourth storage device 144, devices that are placed outside processor groups (or processors of processor groups) and are targeted for access by a processor may be peripheral devices.

A speed at which a specific processor accesses a local peripheral device is faster than a speed at which the specific processor accesses a remote peripheral device. In other words, a latency of access of a remote peripheral device is greater than a latency of access of a local peripheral device. Likewise, efficiency of throughput of a specific peripheral device when accessed by a local processor may be higher than that when accessed by a remote processor.

Figure 2:
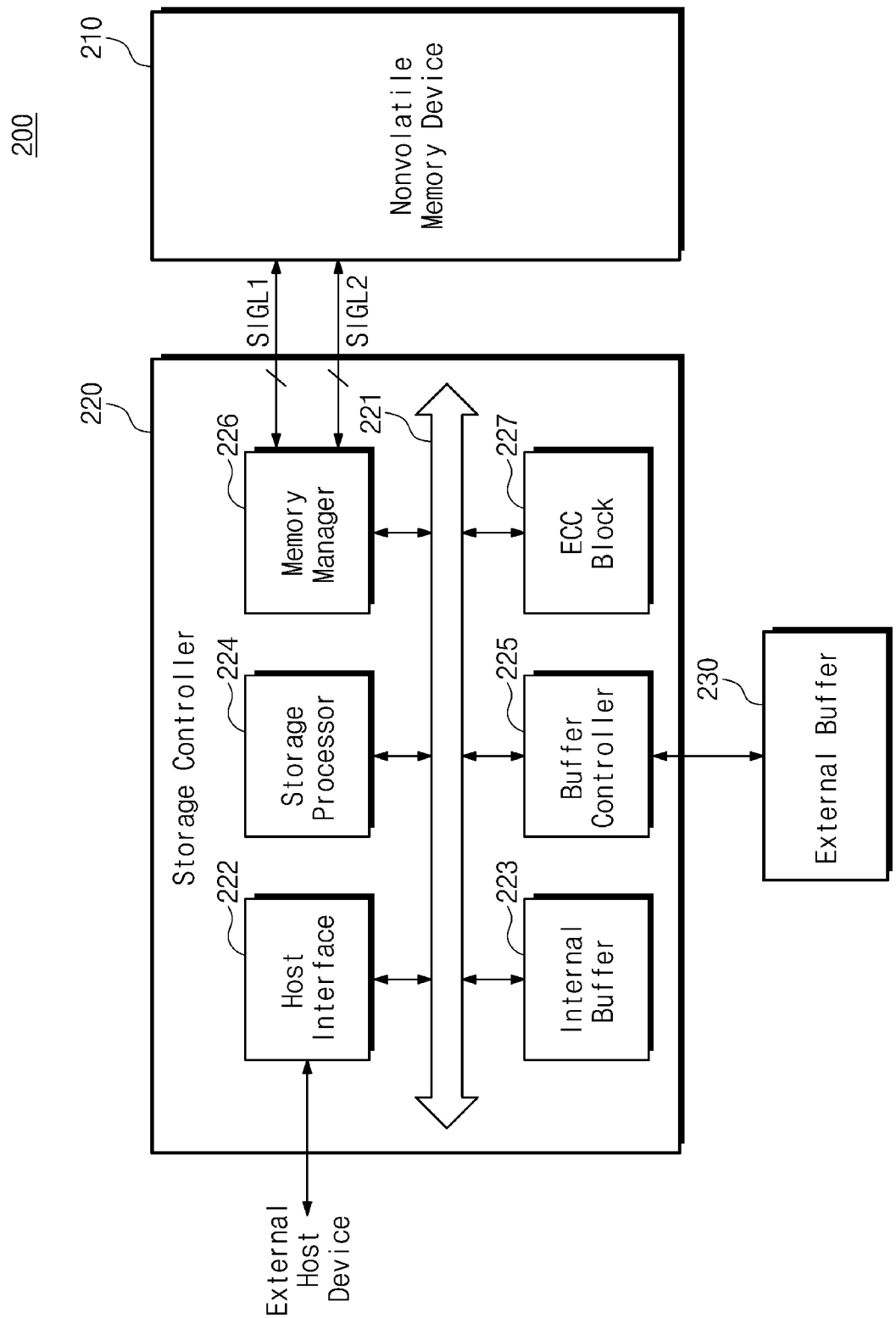
FIG. 2 illustrates a storage device according to an embodiment.

FIG. 2 illustrates a storage device 200 according to an embodiment. In an embodiment, the storage device 200 may correspond to at least one of the first storage device 141, the second storage device 142, the third storage device 143, and the fourth storage device 144 of FIG. 1. Referring to FIGS.

1 and 2, the storage device 200 may include a nonvolatile memory device 210, a storage controller 220, and an external buffer 230. The nonvolatile memory device 210 may include a plurality of memory cells. Each of the plurality of memory cells may store two or more bits.

For example, the nonvolatile memory device 210 may include at least one of various nonvolatile memory devices such as a flash memory device, a phase change memory device, a ferroelectric memory device, a magnetic memory device, and a resistive memory device.

The storage controller 220 may receive various requests for writing data in the nonvolatile memory device 210 or reading data from the nonvolatile memory device 210 from an external host device. The storage controller 220 may store (or buffer) user data communicated with the external host device in the external buffer 230 and may store metadata for managing the storage device 200 in the external buffer 230.

The storage controller 220 may access the nonvolatile memory device 210 through first signal lines SIGL1 and second signal lines SIGL2. For example, the storage controller 220 may send a command and an address to the nonvolatile memory device 210 through the first signal lines SIGL1. The storage controller 220 may exchange data with the nonvolatile memory device 210 through the first signal lines SIGL1.

The storage controller 220 may exchange control signals with the nonvolatile memory device 210 through the second signal lines SIGL2.

In an embodiment, the storage controller 220 may be configured to control two or more nonvolatile memory devices. The storage controller 220 may provide first signal lines and second signal lines for each of the two or more nonvolatile memory devices.

In another embodiment, the storage controller 220 may provide first signal lines so as to be shared by the two or more nonvolatile memory devices. The storage controller 220 may provide a part of second signal lines so as to be shared by the two or more nonvolatile memory devices and may separately provide the remaining part thereof.

The external buffer 230 may include a random access memory. For example, the external buffer 230 may include at least one of a dynamic random access memory, a phase change random access memory, a ferroelectric random access memory, a magnetic random access memory, and a resistive random access memory.

The storage controller 220 may include a bus 221, a host interface 222, an internal buffer 223, a storage processor 224, a buffer controller 225, a memory manager 226, and an error correction code (ECC) block 227.

The bus 221 may provide communication channels between the components in the storage controller 220. The host interface 222 may receive various requests from the external host device and may parse the received requests. The host interface 222 may store the parsed requests in the internal buffer 223.

The host interface 222 may send various responses to the external host device. The host interface 222 may exchange signals with the external host device in compliance with a given communication protocol. The internal buffer 223 may include a random access memory. For example, the internal buffer 223 may include a static random access memory or a dynamic random access memory.

The storage processor 224 may drive an operating system or firmware for driving the storage controller 220. The storage processor 224 may read the parsed requests stored in the internal buffer 223 and may generate commands and addresses for controlling the nonvolatile memory device 210. The storage processor 224 may provide the generated commands and addresses to the memory manager 226.

The storage processor 224 may store various metadata for managing the storage device 200 in the internal buffer 223. The storage processor 224 may access the external buffer 230 through the buffer controller 225. The storage processor 224 may control the buffer controller 225 and the memory manager 226 such that user data stored in the external buffer 230 are provided to the nonvolatile memory device 210.

The storage processor 224 may control the host interface 222 and the buffer controller 225 such that the data stored in the external buffer 230 are provided to the external host device. The storage processor 224 may control the buffer controller 225 and the memory manager 226 such that data received from the nonvolatile memory device 210 are stored in the external buffer 230. The storage processor 224 may control the host interface 222 and the buffer controller 225 such that data received from the external host device are stored in the external buffer 230.

Under control of the storage processor 224, the buffer controller 225 may write data in the external buffer 230 or may read data from the external buffer 230. The memory manager 226 may communicate with the nonvolatile memory device 210 through the first signal lines SIGL1 and the second signal lines SIGL2 under control of the storage processor 224.

The memory manager 226 may access the nonvolatile memory device 210 under control of the storage processor 224. For example, the memory manager 226 may access the nonvolatile memory device 210 through the first signal lines SIGL1 and the second signal lines SIGL2. The memory manager 226 may communicate with the nonvolatile memory device 210, based on a protocol that is defined in compliance with the standard or is defined by a manufacturer.

The error correction code block 227 may perform error correction encoding on data to be provided to the nonvolatile memory device 210 by using an error correction code (ECC). The error correction code block 227 may perform error correction decoding on data received from the nonvolatile memory device 210 by using the error correction code (ECC).

In some embodiments, the storage device 200 may omit the external buffer 230 and the buffer controller 225. When the external buffer 230 and the buffer controller 225 are not included in the storage device 200, the above functions of the external buffer 230 and the buffer controller 225 may be performed by the internal buffer 223.

In an embodiment, the external host device may be selected from the first processor group 111, the second processor group 112, the third processor group 113, and the fourth processor group 114. For example, the external host device may be a local processor or a remote processor. In some embodiments, the external host device may be selected from the processors A, B, C, and D of the first processor group 111, the second processor group 112, the third processor group 113, and the fourth processor group 114.

Figure 3:
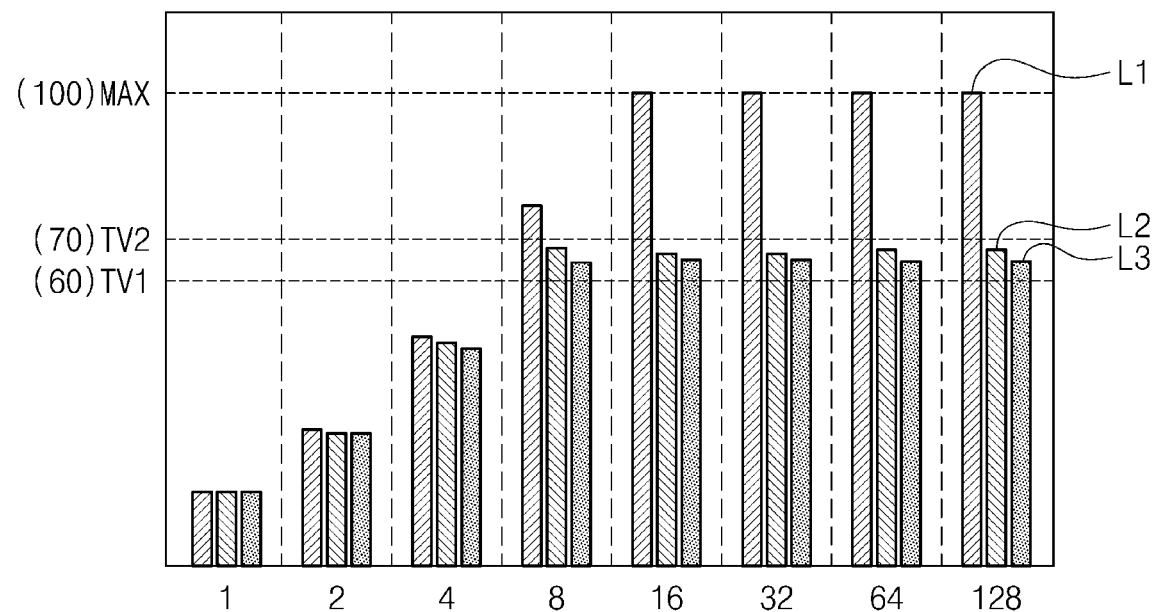
FIG. 3 illustrates an example of a test result of throughput of a storage device, according to an embodiment.

FIG. 3 illustrates an example of a test result of throughput of the storage device 200, according to an embodiment. In an embodiment, a test was performed by using a flexible IO tester (FIO). The FIO was set to "worker16", which indicates that the FIO is capable of sending 16 access commands to the storage device 200 at the same time.

In FIG. 3, a horizontal axis represents a queue depth (QD) set to the FIO. 1, 2, 4, 8, 16, 32, 64, 128 were selected as the queue depth. A vertical axis represents throughput of the storage device 200. For example, the throughput may indicate a speed of an input and output (IO) that the storage device 200 supports and may be expressed in units of IOPS (Input/Output Operations Per Second) or Kilo Input/Output Operation Per Second (MOPS).

In each queue depth, a first line L1 shows a test result of a local mode, and shows the throughput of the storage device 200 when a local processor sends a command for an access to the storage device 200. A second line L2 shows a test result of a normal mode, and shows the throughput of the storage device 200 when a processor selected from a local processor and remote processor sends a command for an access to the storage device 200. A third line L3 shows a test result of a remote mode, and shows the throughput of the storage device 200 when a remote processor sends a command for an access to the storage device 200. The normal mode may be a mixed mode of the local mode and the remote mode. In an embodiment, in the normal mode, a processor that sends an access command to the storage device 200 may be selected from a local processor and a remote processor based on a given policy of the electronic device 100.

Referring to FIGS. 1, 2, and 3, in the settings of "worker16", when the queue depth was 16 or more, the throughput at which a local processor accessed the storage device 200 did not increase any more. That is, in the settings of "worker16", the throughput when the queue depth is 16 or more may be regarded as a maximum throughput MAX of the storage device 200. For example, the maximum throughput MAX of the storage device 200 may be normalized to a value of 100.

In the settings of "worker16", when the queue depth was 4 or less, the storage device 200 that was used in the local mode, the normal mode, and the remote mode provided the throughput of similar levels. That is, when a specific process has an IO requirement of "worker16" and a queue depth of 4 or less with regard to the storage device 200, the corresponding process may use the throughput of the storage device 200, which has similar levels in the local mode, the normal mode, and the remote mode.

In the settings of "worker16", when the queue depth was 8 or more, the storage device 200 provided the throughput that has a difference of a reference value or more between the local mode, the normal mode, and the remote mode. For example, the throughput of the storage device 200 that is used when a remote processor executes a process having an IO requirement of "worker16" and a queue depth of 8 or more with regard to the storage device 200 may be lower than the throughput of the storage device 200 that is used when a local processor executes the corresponding process.

That is, the throughput of the storage device 200 that is used when a local processor executes a specific process may be different from the throughput of the storage device 200 that is used when a remote processor executes the specific process. This result may mean that performance when the local processor executes the specific process is higher than performance when the remote processor executes the specific process.

A first threshold value TV1 and a second threshold value TV2 may be determined based on the test results of FIG. 3. The first threshold value TV1 may be lower than the throughput of the storage device 200 that is used in the remote mode when the queue depth was 8 in the settings of "worker16". For example, the first threshold value TV1 may be 60% of the maximum throughput MAX of the storage device 200. The second threshold value TV2 may be higher than the throughput of the storage device 200 used in the normal mode and lower than the throughput of the storage device 200 used in the local mode, when the queue depth was 8 in the settings of "worker16". For example, the second threshold value TV2 may be 70% of the maximum throughput MAX of the storage device 200.

A specific range may be defined by the first threshold value TV1 and the second threshold value TV2. When the throughput of the storage device 200 belongs to the range from the first threshold value TV1 to the second threshold value TV2, the electronic device 100 may change a processor, which executes a process of accessing the storage device 200, from a remote processor to a local processor. When the change is successfully made, the throughput of the storage device 200 may change from the third line L3 to the first line L1. That is, efficiency of accessing the storage device 200 may be improved, and performance of the process may be improved.

The description is given as the first threshold value TV1 is 60% of the maximum throughput MAX and the second threshold value TV2 is 70% of the maximum throughput MAX. However, values of the first threshold value TV1 and the second threshold value TV2 are not limited to specific values and may vary depending on the performance and physical feature of the storage device 200. In other words, the values of the first threshold value TV1 and the second threshold value TV2 may be set experimentally for a given electronic device operated under a given set of conditions or for a given performance level.

Figure 4:
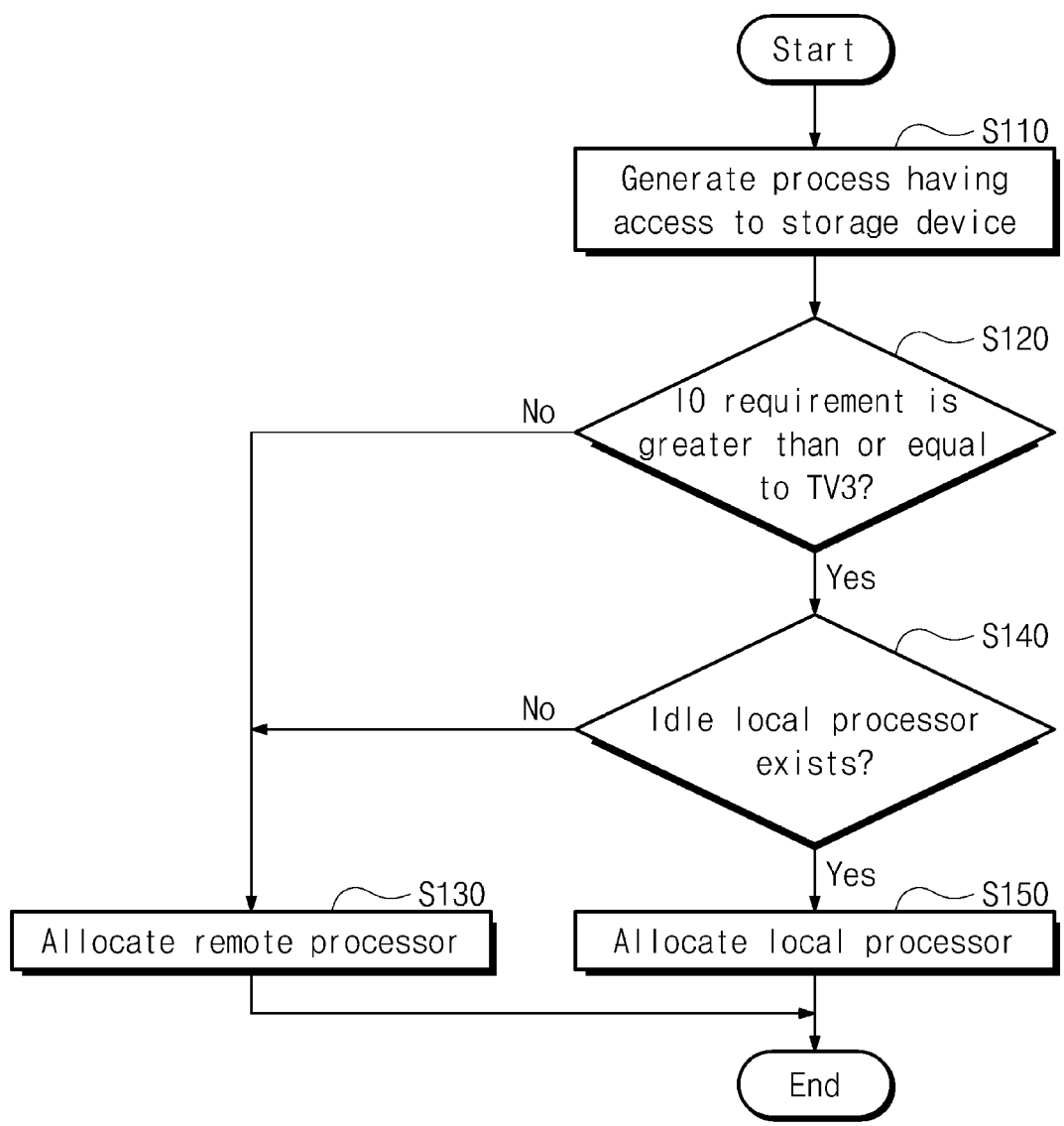
FIG. 4 illustrates an example of an operating method of an electronic device, according to an embodiment.

FIG. 4 illustrates an example of an operating method of the electronic device 100, according to an embodiment. Referring to FIGS. 1, 2, 3, and 4, in operation S110, the electronic device 100 may generate a process having an access (e.g., the IO request) to the storage device 200 (e.g., one specific storage device of the first storage device 141, the second storage device 142, the third storage device 143, and the fourth storage device 144). For example, at least one processor (e.g., at least one processor executing an operating system) of processors A, B, C, and D of the first processor group 111, the second processor group 112, the third processor group 113, and the fourth processor group 114 may execute a new process.

In operation S120, the electronic device 100 (or the at least one processor generating the process) may determine whether an input and output (IO) requirement of the newly generated process is greater than or equal to a third threshold value TV3. For example, the third threshold value TV3 may correspond to "worker16 and queue depth 8". The third threshold value TV3 may be 128 corresponding to a product of 16 being a value of "worker" and 8 being the queue depth.

As described with reference to FIG. 3, in an IO setting lower than "worker16 and queue depth 8", the storage device 200 may provide the throughput that is similar in the local mode, the normal mode, and the remote mode. Accordingly, the electronic device 100 (or the at least one processor generating the process) may allocate the new process to a remote processor (e.g., access a specific storage device through a processor group connected with the specific storage device).

When the IO requirement is greater than or equal to the third threshold value TV3 (operation S120, YES), the electronic device 100 (or the at least one processor generating the process) may perform operation S140. In an embodiment, the third threshold value TV3 may be equal or similar to the second threshold value TV2.

In operation S140, the electronic device 100 (or the at least one processor generating the process) may determine whether a local processor that is in an idle state exists. When the local processor that is in an idle state does not exist (operation S140, NO) or when the IO requirement is less the third threshold value TV3 (operation S120, NO), in operation S130 the electronic device 100 (or the at least one processor generating the process) may allocate the new process to a remote processor (e.g., access a specific storage device through a processor group connected with the specific storage device).

When the local processor that is in an idle state exists (operation S140, YES), in operation S150 the electronic device 100 (or the at least one processor generating the process) may allocate the new process to the local processor (e.g., a processor directly connected with a specific storage device through a node for communication, without passing through any other processor group).

As described above, when use efficiency of the throughput of the storage device 200 is not affected by whether an IO requirement of a new process belongs to any mode of the remote mode, the normal mode, and the local mode (e.g., the use efficiency of the throughput of the storage device 200 is similar), the electronic device 100 may allocate the new process to a remote processor. When use efficiency of the throughput of the storage device 200 is affected by whether an IO requirement of a new process belongs to any mode of the remote mode, the normal mode, and the local mode (e.g., when the use efficiency of the storage device 200 is affected), the electronic device 100 may allocate the new process to a local processor.

According to the embodiment of FIG. 4, processes having an IO requirement for a specific storage device are prevented from being allocated to local processors. Accordingly, heat generation is prevented from being focused on a specific processor group, and the reliability of the electronic device 100 is improved. For example, data stored in a memory may be prevented from being lost due to heat generation.

Figure 5:
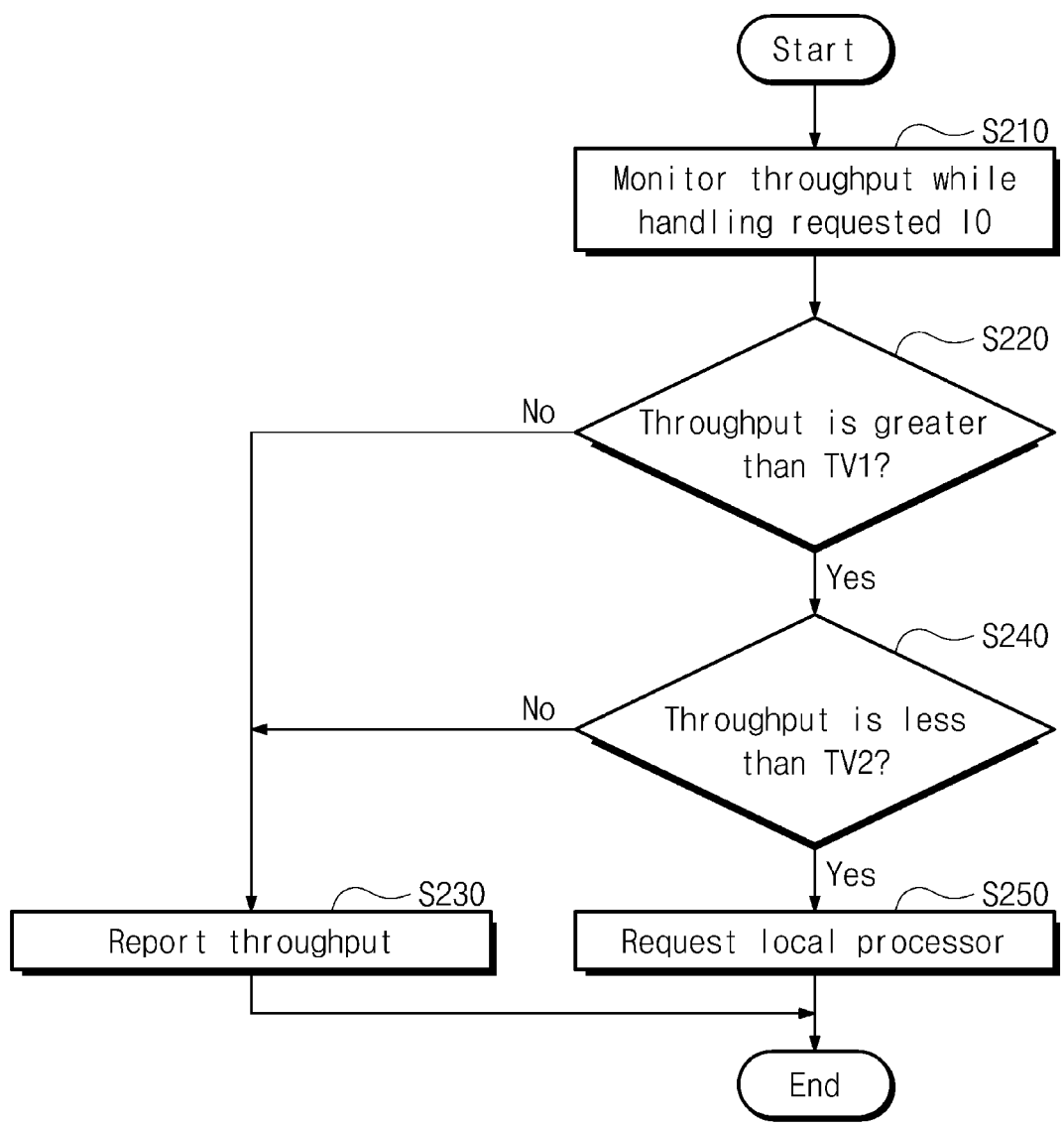
FIG. 5 illustrates a first example of an operating method of a storage device, according to an embodiment.

FIG. 5 illustrates a first example of an operating method of the storage device 200, according to an embodiment. In an embodiment, a first example in which the storage device 200 executes a throughput management process is illustrated in FIG. 5. Referring to FIGS. 1, 2, 3, and 5, in operation S210, the storage device 200 may monitor throughput provided to the external host device while handling an IO requested from the external host device (e.g., a local processor, a remote processor, or a process executed by one thereof). For example, the storage controller 220 of the storage device 200 may monitor the throughput while accessing the nonvolatile memory device 210 based on the requested IO.

In operation S220, the storage device 200 may determine whether the throughput is greater than the first threshold value TV1. When the throughput is not greater than the first threshold value TV1 (e.g., is smaller than or equal to the first threshold value TV1) (operation S220, NO), as described with reference to FIG. 3, the throughput provided to the external host device may not change depending on whether the storage device 200 is used in any mode of the local mode, the normal mode, and the remote mode for the external host device. Accordingly, in operation S230, the storage controller 220 of the storage device 200 may report the throughput to the external host device.

When the throughput is greater than the first threshold value TV1 (operation S220, YES), in operation S240, the storage controller 220 of the storage device 200 may determine whether the throughput is less than the second threshold value TV2. When the throughput is not less than the second threshold value TV2 (e.g., greater than or equal to the second threshold value TV2) (operation S240, NO), the external host device accessing the storage device 200 may be a local processor or a process that is executed by the local processor. Accordingly, in operation S230, the storage controller 220 of the storage device 200 may report the throughput to the external host device.

When the throughput is greater than the first threshold value TV1 and is less than the second threshold value TV2 (operation S240, YES), as described with reference to FIG. 3, the external host device may be a remote processor or a process that is executed by the remote processor. Accordingly, in operation S250, the storage device 200 may request a local processor from the external host device. That is, the storage device 200 may support the improvement of performance of the external host device by comparing the throughput with the first threshold value TV1 and the second threshold value TV2 and requesting the external host device to redistribute a resource depending on a comparison result.

In the case where operation S210 to operation S250 are performed, the throughput management process of the storage device 200 may end. In an embodiment, the throughput management process of the storage device 200 may be performed periodically. Alternatively, the throughput management process of the storage device 200 may be performed in response to a change in a value of the throughput.

For example, the throughput of the storage device 200 may have values from "0" to the maximum throughput MAX. Here, the values from "0" to the maximum throughput MAX may be divided into a plurality of ranges (e.g., in units of normalized 10). The storage controller 220 of the storage device 200 may determine whether a value of the throughput belongs to any range. For example, the storage device 200 may perform the throughput management process in response to a change in a range to which a value of the throughput of the storage device 200 belongs.

Figure 6:
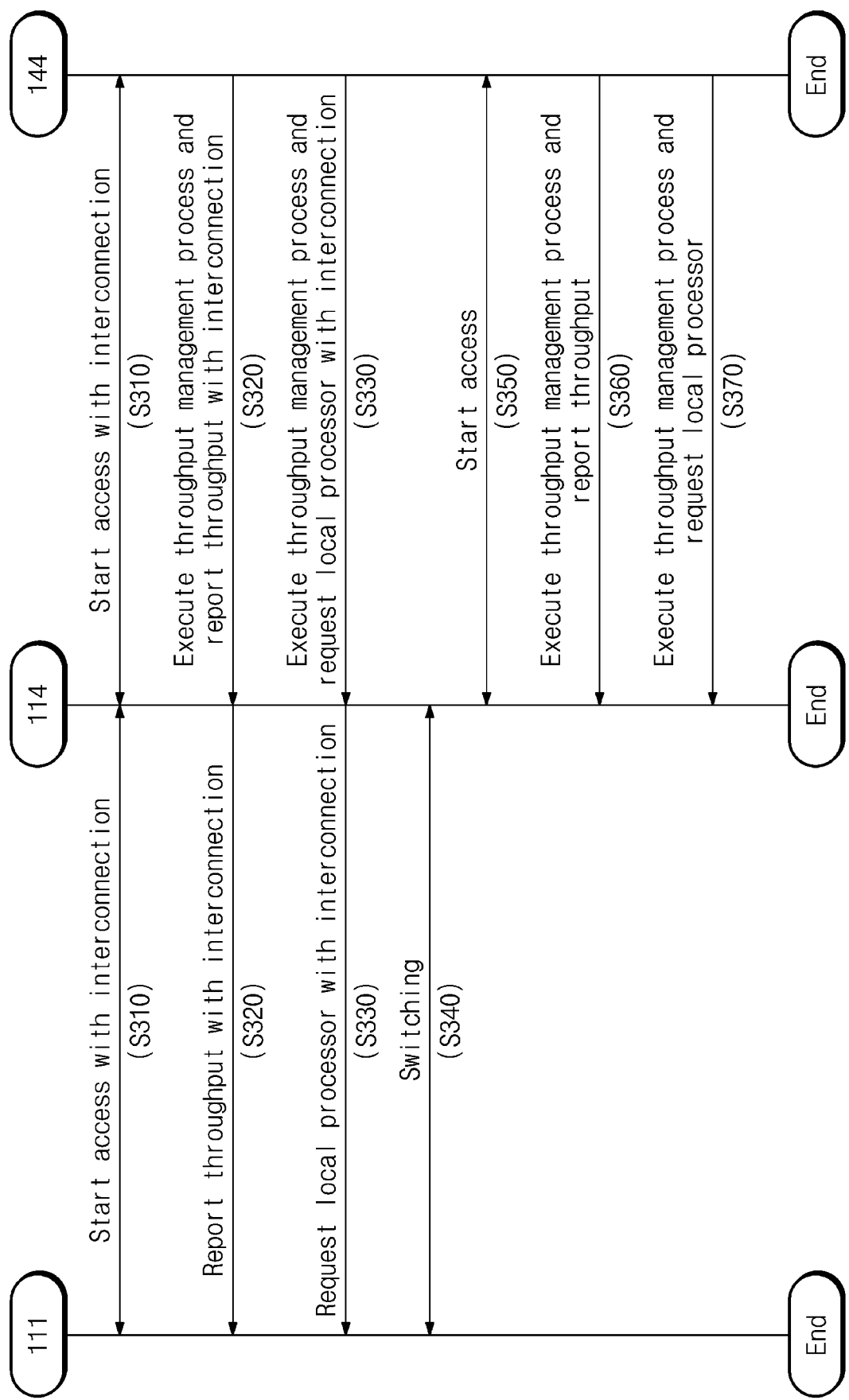
FIG. 6 illustrates an example in which an electronic device operates when a storage device executes a throughput management process of FIG. 5, according to an embodiment.

FIG. 6 illustrates an example in which the electronic device 100 operates when the storage device 200 executes a throughput management process of FIG. 5, according to an embodiment. Referring to FIGS. 1, 5, and 6, in operation S310, a process having an IO requirement for the fourth storage device 144 may be allocated to at least one of the processors A, B, C, and D of the first processor group 111. That is, the process may be a remote process that is allocated to at least one remote processor of the processors A, B, C, and D of the first processor group 111. In operation S310, the remote processor A, B, C, or D of the first processor group 111 (or remote process) may start an access to the fourth storage device 144 through the interconnection with the fourth processor group 114.

In operation S320, the fourth storage device 144 may execute the throughput management process illustrated in FIG. 5, and when the throughput of the fourth storage device 144 does not belong to the range defined by the first threshold value TV1 and the second threshold value TV2, the fourth storage device 144 may report the throughput. For example, the fourth storage device 144 may report the throughput to the remote processor A, B, C, or D of the first processor group 111 (or remote process), based on the interconnection with the fourth processor group 114.

In operation S330, the fourth storage device 144 may execute the throughput management process illustrated in FIG. 5, and when the throughput of the fourth storage device 144 belongs to the range defined by the first threshold value TV1 and the second threshold value TV2, the fourth storage device 144 may request the local processor. For example, the fourth storage device 144 may request the local processor from the remote processor A, B, C, or D of the first processor group 111 (or remote process), based on the interconnection with the fourth processor group 114.

In operation S340, the electronic device 100 may perform switching. For example, an execution subject of the process may be changed from the first processor group 111 to the fourth processor group 114. For example, at least one of the processors A, B, C, and D of the fourth processor group 114 may start the execution of the process having the IO requirement for the fourth storage device 144. For example, the change (e.g., switching) of the processor may be made by at least one processor, which executes an operating system, from among processors A, B, C, and D of the first processor group 111, the second processor group 112, the third processor group 113, and the fourth processor group 114.

In operation S350, at least one of the processors A, B, C, and D of the fourth processor group 114 may start an access to the fourth storage device 144 by executing the process having the IO requirement for the fourth storage device 144. The processor that executes the process may be a local processor, and the process may be a local process. As the fourth storage device 144 is accessed by the local processor (or local process), the throughput of the fourth storage device 144 may be improved, and a speed at which the electronic device 100 executes the process may be improved.

In operation S360, the fourth storage device 144 may execute the throughput management process illustrated in FIG. 5, and when the throughput of the fourth storage device 144 does not belong to the range defined by the first threshold value TV1 and the second threshold value TV2, the fourth storage device 144 may report the throughput.

In operation S370, the fourth storage device 144 may execute the throughput management process illustrated in FIG. 5, and when the throughput of the fourth storage device 144 belongs to the range defined by the first threshold value TV1 and the second threshold value TV2, the fourth storage device 144 may request the local processor. Even though the fourth storage device 144 requests a local processor, because the fourth storage device 144 is already accessed by the local processor (or local process), the local processor (or local process) may ignore the request of the fourth storage device 144.

Figure 7:
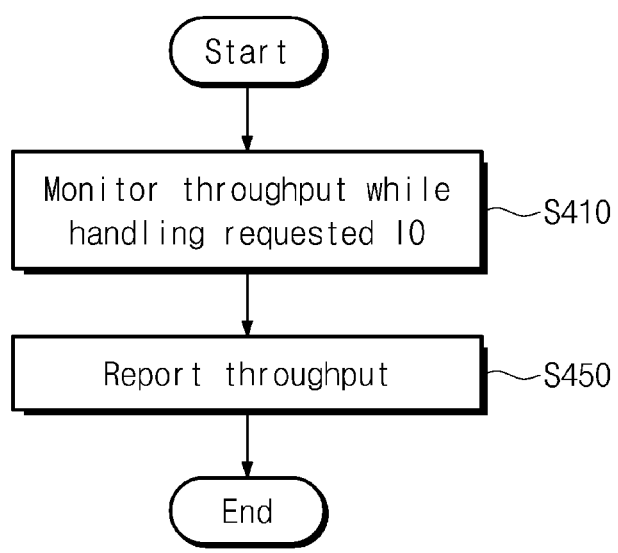
FIG. 7 illustrates a second example of an operating method of a storage device, according to an embodiment.

FIG. 7 illustrates a second example of an operating method of the storage device 200, according to an embodiment. In an embodiment, a second example in which the storage device 200 executes the throughput management process is illustrated in FIG. 7. Referring to FIGS. 1, 2, 3, and 7, in operation S410, the storage device 200 may monitor throughput while handling an IO requested from the external host device (e.g., a local processor, a remote processor, or a process executed by one thereof). For example, the storage controller 220 of the storage device 200 may monitor the throughput while accessing the nonvolatile memory device 210 based on the requested IO.

In operation S420, the storage controller 220 of the storage device 200 may report the throughput to the external host device.

In the case where operation S410 and operation S420 are performed, the throughput management process of the storage device 200 may end. In an embodiment, the throughput management process of the storage device 200 may be performed periodically. Alternatively, the throughput management process of the storage device 200 may be performed in response to a change in a value of the throughput.

For example, the throughput of the storage device 200 may have values from "0" to the maximum throughput MAX. Here, the values from "0" to the maximum throughput MAX may be divided into a plurality of ranges (e.g., in units of normalized 10). The storage controller 220 of the storage device 200 may determine whether a value of the throughput belongs to any range. For example, the storage device 200 may perform the throughput management process in response to a change in a range to which a value of the throughput of the storage device 200 belongs.

Figure 8:
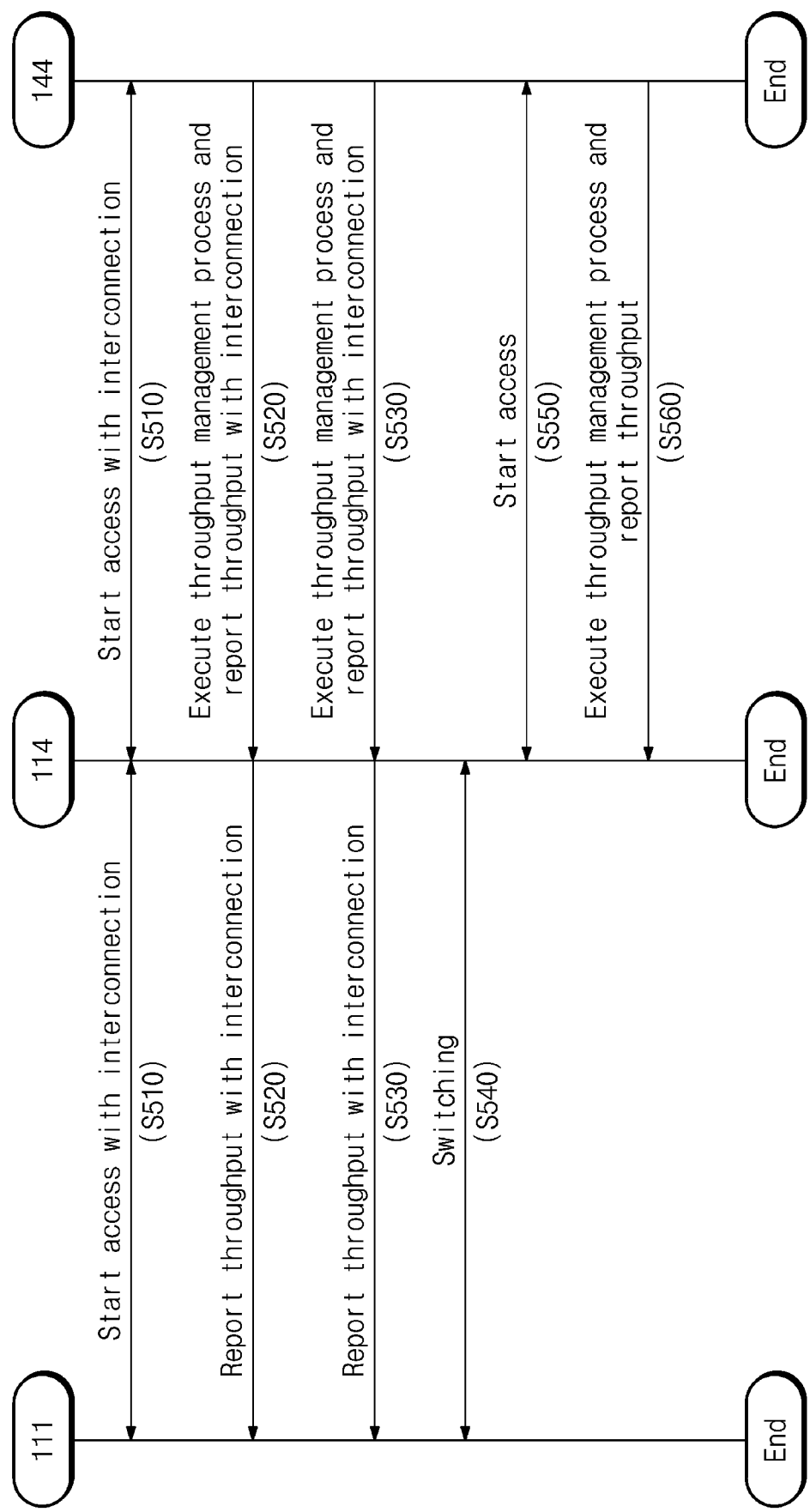
FIG. 8 illustrates an example in which an electronic device operates when a storage device executes a throughput management process of FIG. 7, according to an embodiment.

FIG. 8 illustrates an example in which the electronic device 100 operates when the storage device 200 executes a throughput management process of FIG. 7, according to an embodiment. Referring to FIGS. 1, 7, and 8, in operation S510, a process having an IO requirement for the fourth storage device 144 may be allocated to at least one of the processors A, B, C, and D of the first processor group 111. That is, the process may be a remote process that is allocated to at least one remote processor of the processors A, B, C, and D of the first processor group 111. The remote processor A, B, C, or D of the first processor group 111 (or remote process) may start an access to the fourth storage device 144 through the interconnection with the fourth processor group 114.

In operation S520, the fourth storage device 144 may execute the throughput management process illustrated in FIG. 7, and the fourth storage device 144 may report the throughput. For example, the fourth storage device 144 may report the throughput to the remote processor A, B, C, or D of the first processor group 111 (or remote process), based on the interconnection with the fourth processor group 114. The electronic device 100 may determine whether to perform switching, based on the reported throughput. For example, when the throughput of the fourth storage device 144 does not belong to the range defined by the first threshold value TV1 and the second threshold value TV2, the electronic device 100 may not perform switching.

In operation S530, the fourth storage device 144 may execute the throughput management process illustrated in FIG. 7, and the fourth storage device 144 may report the throughput. For example, the fourth storage device 144 may report the throughput to the remote processor A, B, C, or D of the first processor group 111 (or remote process), based on the interconnection with the fourth processor group 114.

In operation S540, when the throughput of the fourth storage device 144 belongs to the range defined by the first threshold value TV1 and the second threshold value TV2, the electronic device 100 may perform switching. For example, an execution subject of the process may be changed from the first processor group 111 to the fourth processor group 114. At least one of the processors A, B, C, and D of the fourth processor group 114 may start the execution of the process having the IO requirement for the fourth storage device 144. For example, the switching of the processor may be made by at least one processor, which executes an operating system, from among processors A, B, C, and D of the first processor group 111, the second processor group 112, the third processor group 113, and the fourth processor group 114.

In operation S550, at least one of the processors A, B, C, and D of the fourth processor group 114 may start an access to the fourth storage device 144 by executing the process having the IO requirement for the fourth storage device 144. The processor that executes the process may be a local processor, and the process may be a local process. As the fourth storage device 144 is accessed by the local processor (or local process), the throughput of the fourth storage device 144 may be improved, and a speed at which the electronic device 100 executes the process may be improved.

In operation S560, the fourth storage device 144 may execute the throughput management process illustrated in FIG. 7, and the fourth storage device 144 may report the throughput. Even though the throughput of the fourth storage device 144 belongs to the range defined by the first threshold value TV1 and the second threshold value TV2, because the fourth storage device 144 is already accessed by the local processor (or local process), the local processor (or local process) may ignore the request of the fourth storage device 144.

Figure 9:
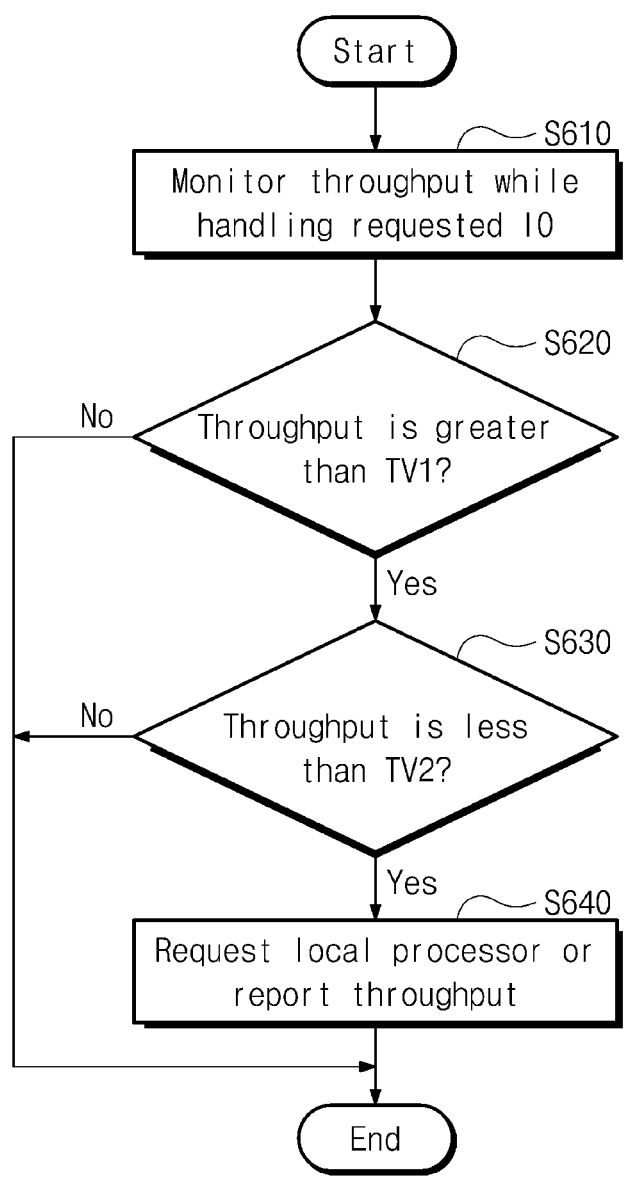
FIG. 9 illustrates a third example of an operating method of a storage device, according to an embodiment.

FIG. 9 illustrates a third example of an operating method of the storage device 200, according to an embodiment. In an embodiment, a third example in which the storage device 200 executes the throughput management process is illustrated in FIG. 9. Referring to FIGS. 1, 2, 3, and 9, in operation S610, the storage device 200 may monitor throughput while handling an IO requested from the external host device (e.g., a local processor, a remote processor, or a process executed by one thereof). For example, the storage controller 220 of the storage device 200 may monitor the throughput while accessing the nonvolatile memory device 210 based on the requested IO.

In operation S620, the storage device 200 may determine whether the throughput is greater than the first threshold value TV1. In operation S630, the storage device 200 may determine whether the throughput is less than the second threshold value TV2. When the throughput is not greater than the first threshold value TV1 (operation S620, NO) or is not less than the second threshold value TV2 (operation S630, NO), that is, when the throughput of the storage device 200 does not belong to the range defined by the first threshold value TV1 and the second threshold value TV2, the storage controller 220 of the storage device 200 may terminate the throughput management process without a separate (or additional) operation.

When the throughput is greater than the first threshold value TV1 (operation S620, YES) and is less than the second threshold value TV2 (operation S630, YES), that is, when the throughput of the storage device 200 belongs to the range defined by the first threshold value TV1 and the second threshold value TV2, in operation S640, the storage controller 220 of the storage device 200 may request a local processor or may report the throughput. In an embodiment, the throughput management process of the storage device 200 may be performed periodically. Alternatively, the throughput management process of the storage device 200 may be performed in response to that a value of the throughput changes.

Figure 10:
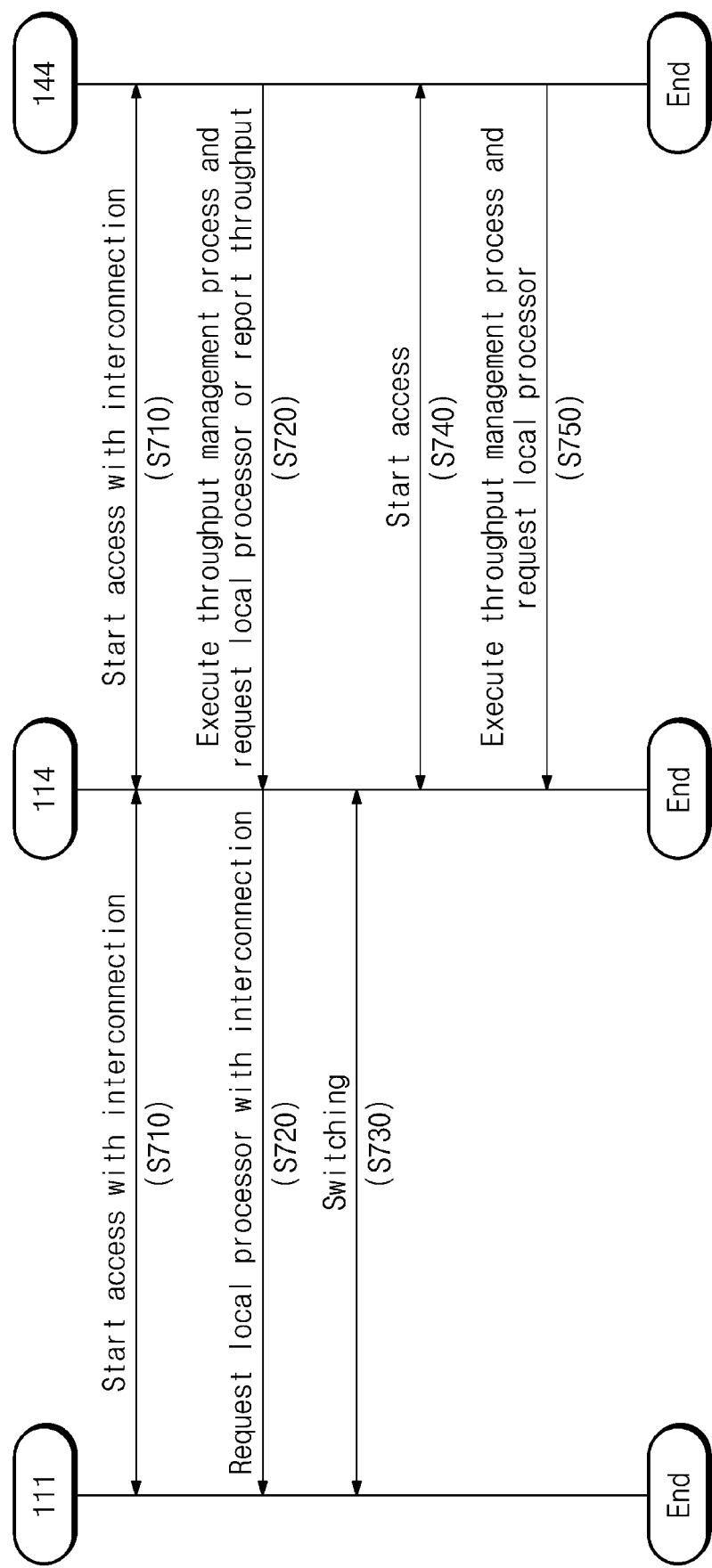
FIG. 10 illustrates an example in which an electronic device operates when a storage device executes a throughput management process of FIG. 9, according to an embodiment.

FIG. 10 illustrates an example in which the electronic device 100 operates when the storage device 200 executes a throughput management process of FIG. 9, according to an embodiment. Referring to FIGS. 1, 9, and 10 in operation S710, a process having an IO requirement for the fourth storage device 144 may be allocated to at least one of the processors A, B, C, and D of the first processor group 111. That is, the process may be a remote process that is allocated to at least one remote processor of the processors A, B, C, and D of the first processor group 111. The remote processor A, B, C, or D of the first processor group 111 (or remote process) may start an access to the fourth storage device 144 through the interconnection with the fourth processor group 114.

In operation S720, the fourth storage device 144 may execute the throughput management process illustrated in FIG. 9, and when the throughput is greater than the first threshold value TV1 and is less than the second threshold value TV2, that is, when the throughput of the storage device 200 belongs to the range defined by the first threshold value TV1 and the second threshold value TV2, the storage controller 220 of the storage device 200 may request a local processor or may report the throughput.

In operation S730, the electronic device 100 may perform switching. For example, an execution subject of the process may be changed from the first processor group 111 to the fourth processor group 114. For example, at least one of the processors A, B, C, and D of the fourth processor group 114 may start the execution of the process having the IO requirement for the fourth storage device 144. For example, the change (e.g., switching) of the processor may be made by at least one processor, which executes an operating system, from among processors A, B, C, and D of the first processor group 111, the second processor group 112, the third processor group 113, and the fourth processor group 114.

In operation S740, at least one of the processors A, B, C, and D of the fourth processor group 114 may start an access to the fourth storage device 144 by executing the process having the IO requirement for the fourth storage device 144. The processor that executes the process may be a local processor, and the process may be a local process. As the fourth storage device 144 is accessed by the local processor (or local process), the throughput of the fourth storage device 144 may be improved, and a speed at which the electronic device 100 executes the process may be improved.

In operation S750, the fourth storage device 144 may execute the throughput management process illustrated in FIG. 9, and when the throughput of the fourth storage device 144 belongs to the range defined by the first threshold value TV1 and the second threshold value TV2, the fourth storage device 144 may request a local processor. Even though the fourth storage device 144 requests a local processor, because the fourth storage device 144 is already accessed by the local processor (or local process), the local processor (or local process) may ignore the request of the fourth storage device 144.

Figure 11:
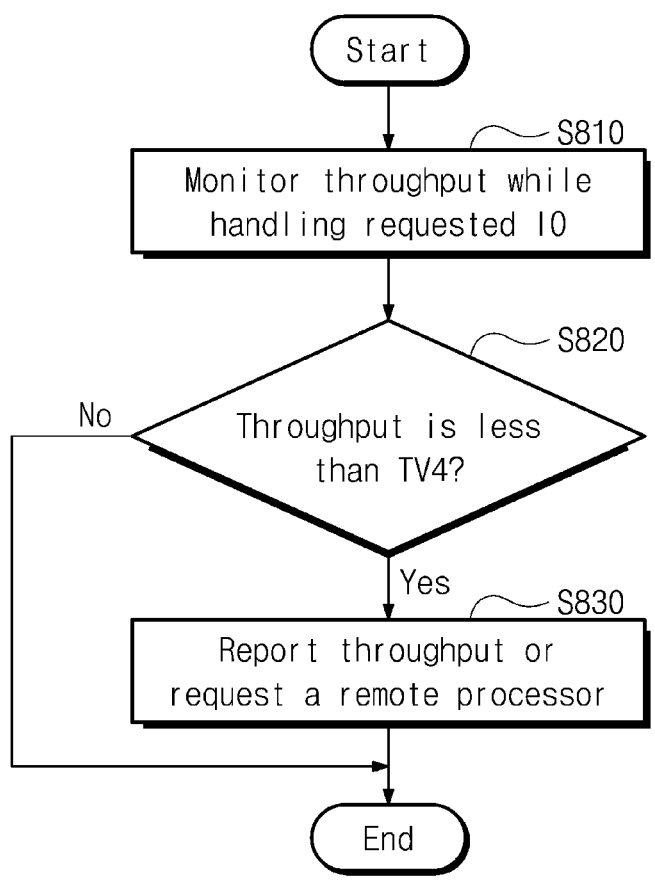
FIG. 11 illustrates a fourth example of an operating method of a storage device, according to an embodiment.

FIG. 11 illustrates a fourth example of an operating method of the storage device 200, according to an embodiment. In an embodiment, a fourth example in which the storage device 200 executes the throughput management process is illustrated in FIG. 11. Referring to FIGS. 1, 2, 3, and 11, in operation S810, the storage device 200 may monitor throughput while handling an IO requested from the external host device (e.g., a local processor, a remote processor, or a process executed by one thereof). For example, the storage controller 220 of the storage device 200 may monitor the throughput while accessing the nonvolatile memory device 210 based on the requested 10.

In operation S820, the storage controller 220 of the storage device 200 may determine whether the throughput of the storage device 200 is less than a fourth threshold value TV4. When the throughput of the storage device 200 is not less than the fourth threshold value TV4 (operation S820, NO), the storage controller 220 may terminate the throughput management process.

When the throughput of the storage device 200 is less than the fourth threshold value TV4 (operation S820, YES), in operation S830, the storage controller 220 may report the throughput to the external host device or may request a remote processor.

In response to the storage device 200 reporting that the throughput or requesting a remote processor, the electronic device 100 may determine whether a processor accessing the storage device 200 is a local processor. When the processor accessing the storage device 200 is a local processor, the electronic device 100 may allocate the process accessing the storage device 200 to a remote processor. That is, the switching of the processor may be performed. When the processor accessing the storage device 200 is a remote processor, the electronic device 100 may ignore the report or request of the storage device 200.

In the case where operation S810 to operation S830 are performed, the throughput management process may end. In an embodiment, the throughput management process of the storage device 200 may be performed periodically. Alternatively, the throughput management process of the storage device 200 may be performed in response to that a value of the throughput changes.

In an embodiment, the fourth threshold value TV4 may be less than the first threshold value TV1 and the second threshold value TV2. The fourth threshold value TV4 may be determined based on throughput corresponding to the queue depth of 1, 2, or 4. The fourth threshold value TV4 may be set to 50% or less of the maximum throughput MAX, such as 50%, 40%, 30%, or 20%. In an embodiment, to prevent the switching due to a transient change of the throughput, the storage device 200 may compare average throughput (e.g., a running average or a running average during a given time interval) with the fourth threshold value TV4.

Figure 12:
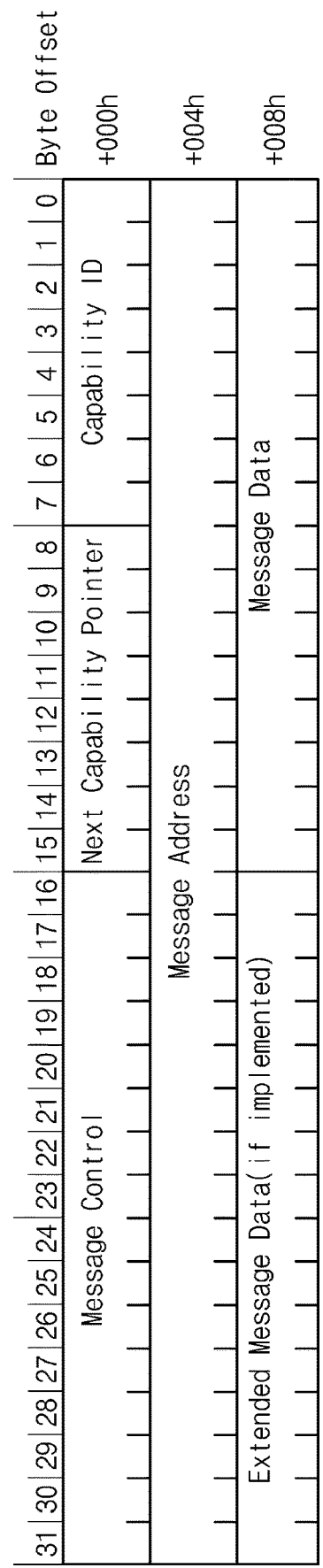
FIG. 12 illustrates a second example of a format of a request or report that a storage device sends to an external host device, according to an embodiment.

FIG. 12 illustrates a first example of a format of a request or report that the storage device 200 may send to an external host device, according to an embodiment. Referring to FIGS. 1, 2, and 12, the storage device 200 may send a request or a report based on the Peripheral Component Interconnect express (PCIe). The storage device 200 may send a Message Signaled Interrupt (MSI) capability structure for a 32-bit message address to a corresponding processor. The corresponding processor may store the MSI capability structure for the 32-bit message address in a register.

The MSI capability structure for the 32-bit message address may include byte offsets "+000h", "+004h", and "+008h". The byte offset "+000h" may include 0-th to 31st bits. The 0-th to 15th bits of the byte offset "+000h" may correspond to an MSI capability header. The 0-th to 7th bits of the MSI capability header of the byte offset "+000h" may include a capability ID. The capability ID may have a value of "05h". The 8th to 15th bits of the MSI capability header of the byte offset "+000h" may include a next capability pointer. The next capability pointer may include an offset for a next PCI capability structure. When other items are absent from a linked list of capabilities, a next capability pointer may include "00h".

Figure 13:
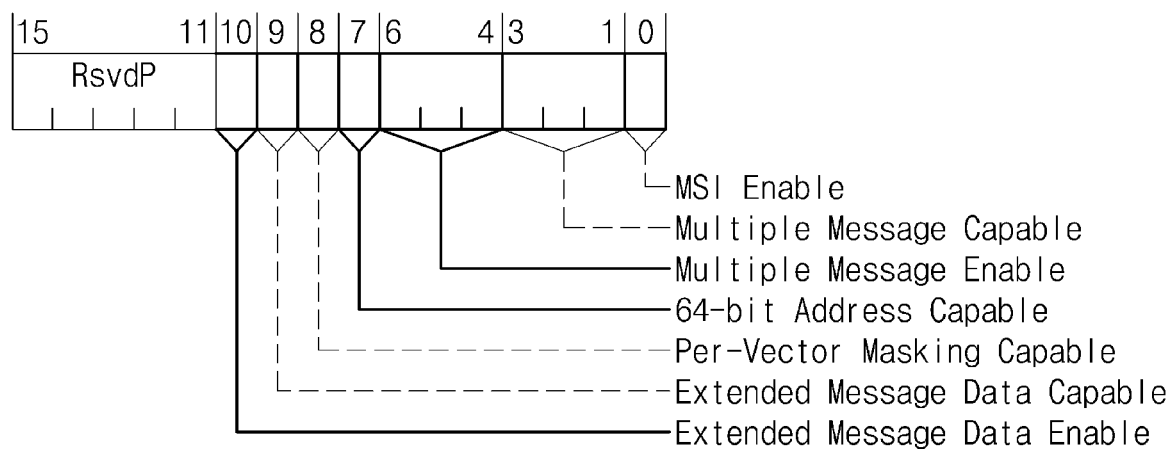
FIG. 13 illustrates an example of a message control register, according to an embodiment.

The 16th to 31st bits of the byte offset "+000h" may correspond to a message control register. An example of the message control register is illustrated in FIG. 13, according to an embodiment. Referring to FIGS. 1, 2, 12, and 13, the 16th bit (or the 0-th bit of the message control register) indicates "MSI enable" and may have a value of "1" when the storage device 200 sends a report or a request to the corresponding processor. The 17th to 19th bits (or the 1st to 3rd bits of the message control register) may indicate "multiple message capable". Multiple messages may be called "vectors". The number of vectors may be set to a multiple of 2.

The 20th to 22nd bits (or the 4th to 6th bits of the message control register) may indicate "multiple message enable" The 23rd bit (or the 7th bit of the message control register) may indicate "64-bit address capable". The 24th bit (or the 8th bit of the message control register) may indicate "per-vector masking capable".

The 25th bit (or the 9th bit of the message control register) may indicate "extended message data capable". The 26th bit (or the 10th bit of the message control register) may indicate "extended message data enable".

The 27th to 31st bits (or the 11th to 15th bits of the message control register) may be reserved bits (RsvdP). Alternatively, the storage device 200 may record information (or a message) for a report of throughput or a request of a local (or remote) processor described with reference to FIGS. 1 to 11 at the 27th to 31st bits of the byte offset "+000h" of the MSI capability structure for the 32-bit message address (or at the 11th to 15th bits of the message control register).

Referring again to FIGS. 1, 2, and 12, the byte offset "+004h" of the MSI capability structure for the 32-bit message address may include 0-th to 31st bits. The 0-th to 31st bits of the byte offset "+004h" may correspond to a message address register and may be defined by "device-specific" or "system-specific".

The byte offset "+008h" of the MSI capability structure for the 32-bit message address may include 0-th to 31st bits. The 0-th to 15th bits of the byte offset "+008h" may correspond to a message data register. A format of information recorded at the message data register may be defined by "device-specific" or "system-specific". In an embodiment, the storage device 200 may record information (or a message) for a report of throughput or a request of a local (or remote) processor described with reference to FIGS. 1 to 11 at the 0-th to 15th bits of the byte offset "+008h" of the MSI capability structure for the 32-bit message address (or at the 0-th to 15th bits of the message data register).

The 16th to 31st bits of the byte offset "+008h" may correspond to an extended message data register, and whether to implement the extended message data register and the format of the recorded information may be defined by "device-specific" or "system-specific". In an embodiment, the storage device 200 may record information (or a message) for a report of throughput or a request of a local (or remote) processor described with reference to FIGS. 1 to 11 at the 16th to 31st bits of the byte offset "+008h" of the MSI capability structure for the 32-bit message address (or at the 0-th to 15th bits of the extended message data register).

Figure 14:
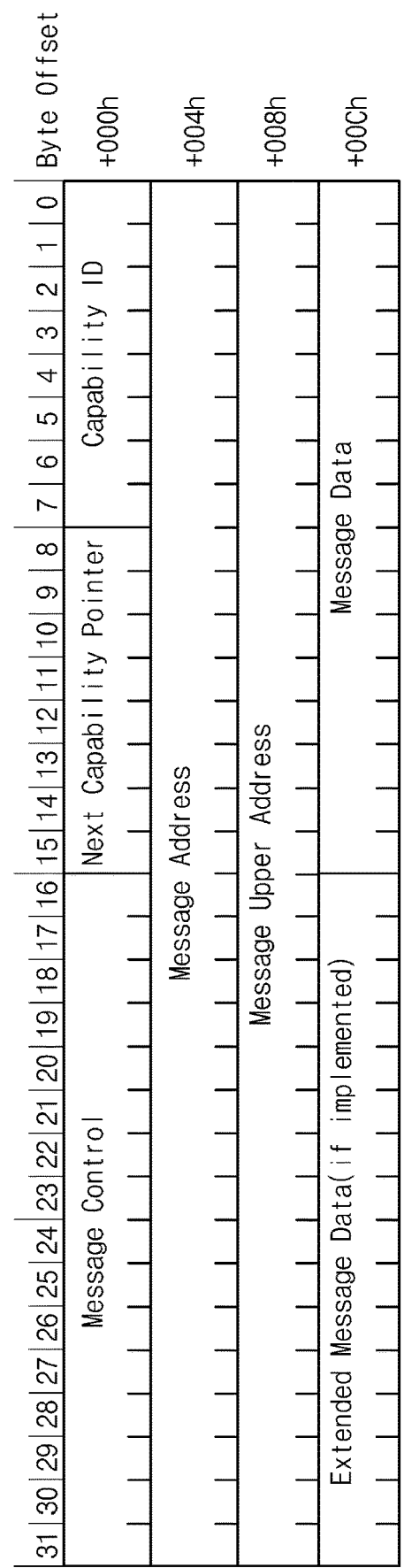
FIG. 14 illustrates a second example of a format of a request or report that a storage device sends to an external host device, according to an embodiment.

FIG. 14 illustrates a second example of a format of a request or report that the storage device 200 sends to an external host device, according to an embodiment. Referring to FIGS. 1, 2, and 14, the storage device 200 may send a request or a report based on the PCIe. The storage device 200 may send an MSI capability structure for a 64-bit message address to a corresponding processor. The corresponding processor may store the MSI capability structure for the 64-bit message address in a register.

The MSI capability structure for the 64-bit message address may include byte offsets "+000h", "+004h", "+008h", and "+00ch". The byte offset "+000h" may include 0-th to 31st bits. The 0-th to 15th bits of the byte offset "+000h" may correspond to an MSI capability header. The 0-th to 7th bits of the MSI capability header of the byte offset "+000h" may include a capability ID. The 8th to 15th bits of the MSI capability header of the byte offset "+000h" may include a next capability pointer. The 16th to 31st bits of the byte offset "+000h" may correspond to a message control register. The byte offset "+000h" of the MSI capability structure for the 64-bit message address may be implemented the same as that described with reference to FIGS. 12 and 13. Thus, additional description will be omitted to avoid redundancy.

The byte offset "+004h" of the MSI capability structure for the 64-bit message address may include 0-th to 31st bits. The 0-th to 31st bits of the byte offset "+004h" may correspond to a message address register and may be defined by "device-specific" or "system-specific".

The byte offset "+008h" of the MSI capability structure for the 64-bit message address may include 0-th to 31st bits. The 0-th to 31st bits of the byte offset "+008h" may correspond to a message upper address register and may be defined by "device-specific" or "system-specific".

The byte offset "+00ch" of the MSI capability structure for the 64-bit message address may include 0-th to 31st bits. The 0-th to 15th bits of the byte offset "+00ch" may correspond to a message data register. A format of information recorded at the message data register may be defined by "device-specific" or "system-specific". In an embodiment, the storage device 200 may record information (or a message) for a report of throughput or a request of a local (or remote) processor described with reference to FIGS. 1 to 11 at the 0-th to 15th bits of the byte offset "+008h" of the MSI capability structure for the 64-bit message address (or at the 0-th to 15th bits of the message data register).

The 16th to 31st bits of the byte offset "+00ch" may correspond to an extended message data register, and whether to implement the extended message data register and the format of the recorded information may be defined by "device-specific" or "system-specific". In an embodiment, the storage device 200 may record information (or a message) for a report of throughput or a request of a local (or remote) processor described with reference to FIGS. 1 to 11 at the 16th to 31st bits of the byte offset "+008h" of the MSI capability structure for the 64-bit message address (or at the 0-th to 15th bits of the extended message data register).

Figure 15:
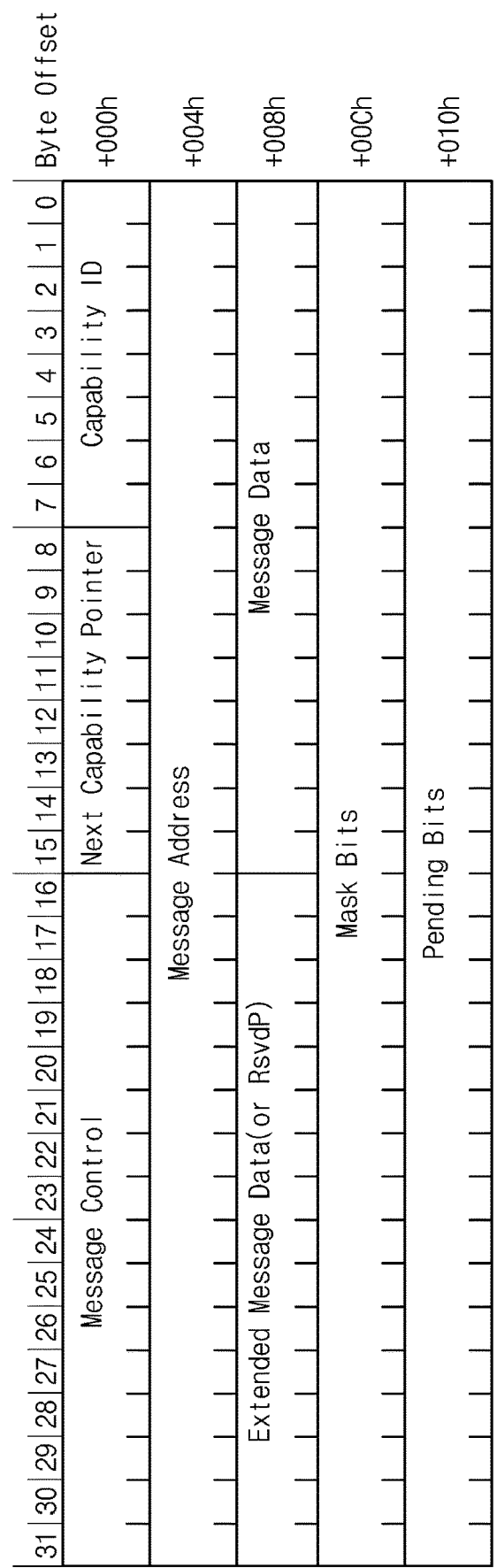
FIG. 15 illustrates a third example of a format of a request or report that a storage device sends to an external host device; according to an embodiment.

FIG. 15 illustrates a third example of a format of a request or report that the storage device 200 sends to an external host device, according to an embodiment. Referring to FIGS. 1, 2, and 15, the storage device 200 may send a request or a report based on the PCIe. The storage device 200 may send an MSI capability structure for a 32-bit message address and a per vector mask (PVM) to a corresponding processor. The corresponding processor may store the MSI capability structure for the 32-bit message address and the PVM in a register.

The MSI capability structure for the 32-bit message address and the PVM may include byte offsets "+000h", "+004h", "+008h", "+00ch", and "+010h". The byte offset "+000h" may include 0-th to 31st bits. The 0-th to 15th bits of the byte offset "+000h" may correspond to an MSI capability header. The 0-th to 7th bits of the MSI capability header of the byte offset "+000h" may include a capability ID. The 8th to 15th bits of the MSI capability header of the byte offset "+000h" may include a next capability pointer. The 16th to 31st bits of the byte offset "+000h" may correspond to a message control register. The byte offset "+000h" of the MSI capability structure for the 32-bit message address and the PVM may be implemented the same as that described with reference to FIGS. 12 and 13. Thus, additional description will be omitted to avoid redundancy.

The byte offset "+004h" of the MSI capability structure for the 32-bit message address and the PVM may include 0-th to 31st bits. The 0-th to 31st bits of the byte offset "+004h" may correspond to a message address register and may be defined by "device-specific" or "system-specific".

The byte offset "+008h" of the MSI capability structure for the 32-bit message address and the PVM may include 0-th to 31st bits. The 0-th to 15th bits of the byte offset "+008h" may correspond to a message data register. A format of information recorded at the message data register may be defined by "device-specific" or "system-specific". In an embodiment, the storage device 200 may record information (or a message) for a report of throughput or a request of a local (or remote) processor described with reference to FIGS. 1 to 11 at the 0-th to 15th bits of the byte offset "+008h" of the MSI capability structure for the 32-bit message address and the PVM (or at the 0-th to 15th bits of the message data register).

The 16th to 31st bits of the byte offset "+008h" may correspond to an extended message data register, and whether to implement the extended message data register and the format of the recorded information may be defined by "device-specific" or "system-specific". In the case where the extended message data register is not implemented, the 16th to 31st bits of the byte offset "+008h" may be reserved bits (RsvdP). In an embodiment, the storage device 200 may record information (or a message) for a report of throughput or a request of a local (or remote) processor described with reference to FIGS. 1 to 11 at the 16th to 31st bits of the byte offset "+008h" of the MSI capability structure for the 32-bit message address and the PVM (or at the 0-th to 15th bits of the message data register).

The byte offset "+00ch" of the MSI capability structure for the 32-bit message address and the PVM may include 0-th to 31st bits. The 0-th to 31st bits of the byte offset "+00ch" may correspond to a mask bits register and may store information about "per-vector masking capable".

The byte offset "+010h" of the MSI capability structure for the 32-bit message address and the PVM may include 0-th to 31st bits. The 0-th to 31st bits of the byte offset "+010h" may correspond to a pending bits register and may present when "per-vector masking capable" is set.

Figure 16:
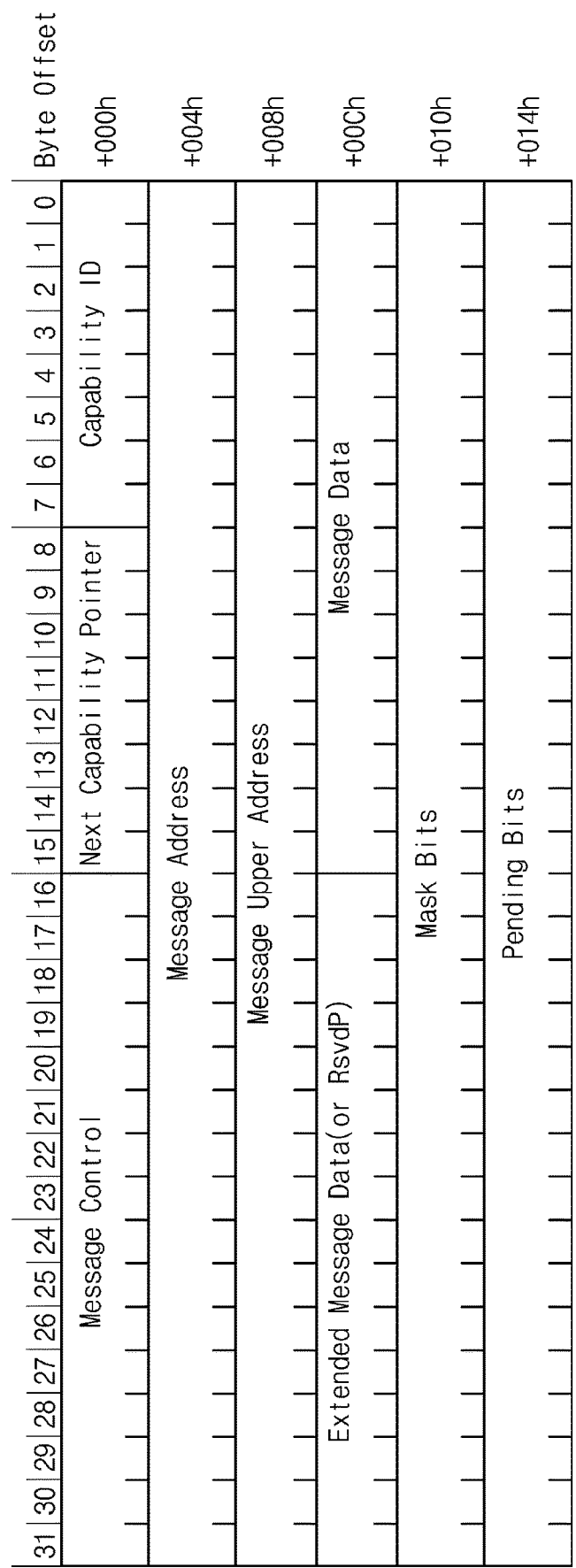
FIG. 16 illustrates an example of a format of a request or report that a storage device sends to an external host device, according to an embodiment.

FIG. 16 illustrates an example of a format of a request or report that the storage device 200 sends to an external host device, according to an embodiment. Referring to FIGS. 1, 2, and 16, the storage device 200 may send a request or a report based on the PCIe. The storage device 200 may send an MSI capability structure for a 64-bit message address and a per vector mask (PVM) to a corresponding processor. The corresponding processor may store the MSI capability structure for the 64-bit message address and the PVM in a register.

The MSI capability structure for the 64-bit message address and the PVM may include byte offsets "+000h", "+004h", "+008h", "+00ch", "+010h", and "+014h". The byte offset "+000h" may include 0-th to 31st bits. The 0-th to 15th bits of the byte offset "+000h" may correspond to an MSI capability header. The 0-th to 7th bits of the MSI capability header of the byte offset "+000h" may include a capability ID. The 8th to 15th bits of the MSI capability header of the byte offset "+000h" may include a next capability pointer. The 16th to 31st bits of the byte offset "+000h" may correspond to a message control register. The byte offset "+000h" of the MSI capability structure for the 64-bit message address and the PVM may be implemented the same as that described with reference to FIGS. 12 and 13. Thus, additional description will be omitted to avoid redundancy.

The byte offset "+004h" of the MSI capability structure for the 64-bit message address may include 0-th to 31st bits. The 0-th to 31st bits of the byte offset "+004h" may correspond to a message address register and may be defined by "device-specific" or "system-specific".

The byte offset "+008h" of the MSI capability structure for the 64-bit message address and the PVM may include 0-th to 31st bits. The 0-th to 31st bits of the byte offset "+008h" may correspond to a message upper address register and may be defined by "device-specific" or "system-specific".

The byte offset "+00ch" of the MSI capability structure for the 64-bit message address and the PVM may include 0-th to 31st bits. The 0-th to 15th bits of the byte offset "+00ch" may correspond to a message data register. A format of information recorded at the message data register may be defined by "device-specific" or "system-specific". In an embodiment, the storage device 200 may record information (or a message) for a report of throughput or a request of a local (or remote) processor described with reference to FIGS. 1 to 11 at the 0-th to 15th bits of the byte offset "+008h" of the MSI capability structure for the 64-bit message address and the PVM (or at the 0-th to 15th bits of the message data register).

The 16th to 31st bits of the byte offset "+00ch" may correspond to an extended message data register, and whether to implement the extended message data register and the format of the recorded information may be defined by "device-specific" or "system-specific". In the case where the extended message data register is not implemented, the 16th to 31st bits of the byte offset "+00ch" may be reserved bits (RsvdP). In an embodiment, the storage device 200 may record information (or a message) for a report of throughput or a request of a local (or remote) processor described with reference to FIGS. 1 to 11 at the 16th to 31st bits of the byte offset "+00ch" of the MSI capability structure for the 64-bit message address and the PVM (or at the 0-th to 15th bits of the message data register).

The byte offset "+010h" of the MSI capability structure for the 64-bit message address and the PVM may include 0-th to 31st bits. The 0-th to 31st bits of the byte offset "+010h" may correspond to a mask bits register and may store information about "per-vector masking capable".

The byte offset "+014h" of the MSI capability structure for the 64-bit message address and the PVM may include 0-th to 31st bits. The 0-th to 31st bits of the byte offset "+014h" may correspond to a pending bits register and may present when "per-vector masking capable" is set.

As described above, the electronic device 100 may allocate a remote processor or a local processor based on an IO requirement for a storage device of a newly generated process. Accordingly, processes accessing a specific storage device may be prevented from being intensively allocated to local processors, and the heat generation of the first processor group 111, the second processor group 112, the third processor group 113, and the fourth processor group 114 may be uniformly distributed. Also, a refresh interval of the memories 131, 132, 133, and 134 may be prevented from becoming short, and the performance and reliability of the electronic device 100 may be improved.

In addition, the storage device 200 may send performance information, for example, information about a ratio of current throughput to the maximum throughput MAX to a processor. The processor may switch a processor, which accesses the storage device 200, between a local processor and a remote processor, based on performance information of the storage device 200. Accordingly, the electronic device 100 may access the storage device 200 with optimized performance.

Figure 17:
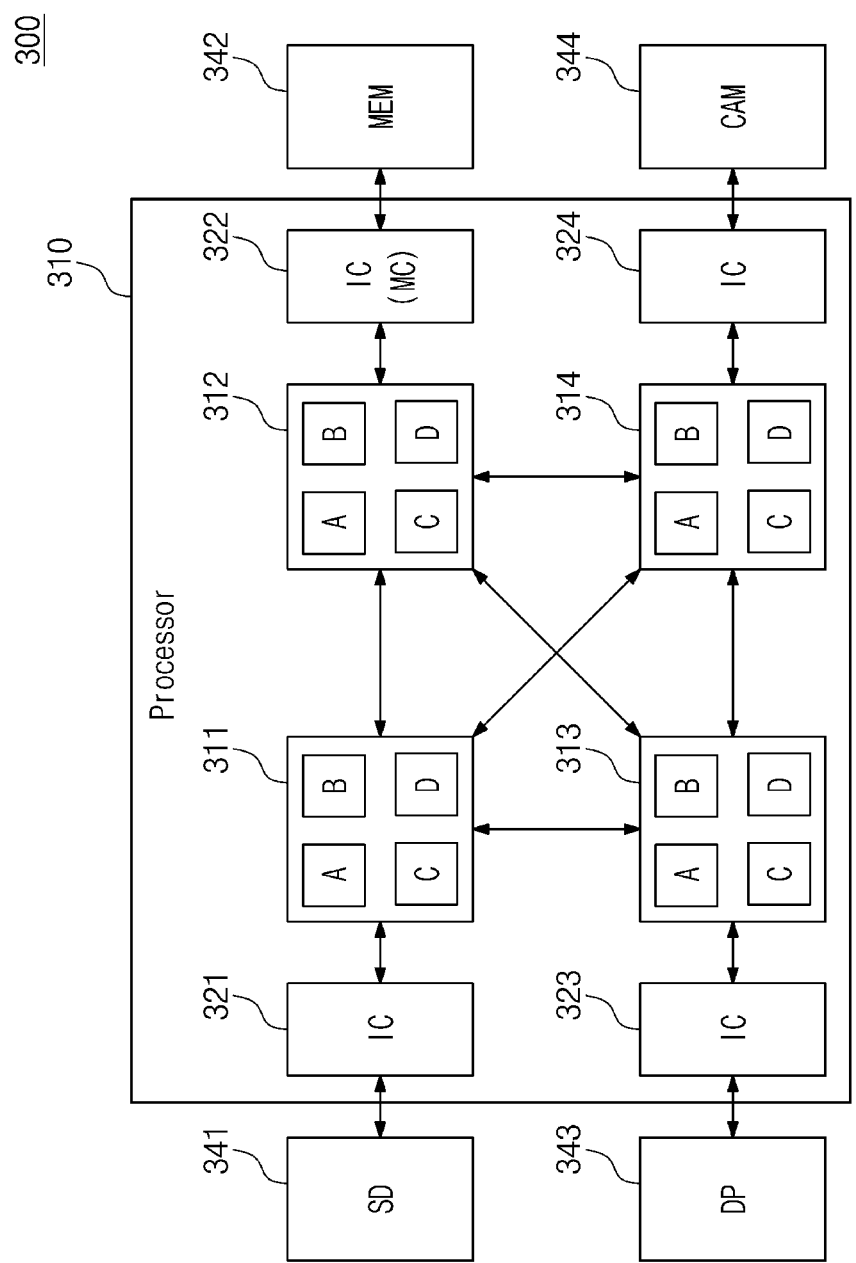
FIG. 17 illustrates an electronic device according to another embodiment.

FIG. 17 illustrates an electronic device 300 according to another embodiment. Referring to FIG. 17, the electronic device 300 may include a processor 310, a storage device (SD) 341, a memory (MEM) 342, a display device (DP) 343, and a camera module (CAM) 344. The processor 310 may store original data of codes and user data in the storage device 341. The processor 310 may load and execute the codes from the storage device 341 to the memory 342 and may temporarily load the user data onto the memory 342 for the purpose of access or revision. The processor 310 may display image data through the display device 343. The processor 310 may generate image data by using the camera module 344.

The processor 310 may include a first core group 311, a second core group 312, a third core group 313, and a fourth core group 314. Each of the first core group 311, the second core group 312, the third core group 313, and the fourth core group 314 may include a plurality of cores A, B, C, and D.

The processor 310 may include a first interface circuit (IC) 321, a second interface circuit (IC) 322, a third interface circuit (IC) 323, and a fourth interface circuit (IC) 324 corresponding to the first core group 311, the second core group 312, the third core group 313, and the fourth core group 314, respectively.

The first core group 311 may be directly connected with the first interface circuit 321. In some embodiments, the cores A, B, C, and D of the first core group 311 may be directly connected to the first interface circuit 321. The cores A, B, C, and D of the first core group 311 may be local cores of the first interface circuit 321. The first interface circuit 321 may be a local interface circuit of the first core group 311. The second core group 312 may be directly connected with the second interface circuit 322. In some embodiments, the cores A, B, C, and D of the second core group 312 may be directly connected to the second interface circuit 322. The cores A, B, C, and D of the second core group 312 may be local cores of the second interface circuit 322. The second interface circuit 322 may be a local interface circuit of the second core group 312.

The third core group 313 may be directly connected with the third interface circuit 323. In some embodiments, the cores A, B, C, and D of the third core group 313 may be directly connected to the third interface circuit 323. The cores A, B, C, and D of the third core group 313 may be local cores of the third interface circuit 323. The third interface circuit 323 may be a local interface circuit of the third core group 313. The fourth core group 314 may be directly connected with the fourth interface circuit 324. In some embodiments, the cores A, B, C, and D of the fourth core group 314 may be directly connected to the fourth interface circuit 324. The cores A, B, C, and D of the fourth core group 314 may be local cores of the fourth interface circuit 324. The fourth interface circuit 324 may be a local interface circuit of the fourth core group 314.

The first core group 311 may access the second interface circuit 322, the third interface circuit 323, and the fourth interface circuit 324 through the second core group 312, the third core group 313, and the fourth core group 314, respectively. The cores A, B, C, and D of the first core group 311 may be remote cores of the second interface circuit 322, the third interface circuit 323, and the fourth interface circuit 324. The second interface circuit 322, the third interface circuit 323, and the fourth interface circuit 324 may be remote interface circuits of the first core group 311.

As such, an interface circuit and cores that are directly connected to communicate with each other may be a local interface circuit and local cores. An interface circuit and cores that are connected through another core group to communicate with each other may be a remote interface circuit and remote cores. Below, duplicated descriptions are omitted for conciseness.

The first interface circuit 321 may be directed connected with the storage device 341. The second interface circuit 322 may be directly connected with the memory 342. The third interface circuit 323 may be directed connected with the display device 343. The fourth interface circuit 324 may be directed connected with the camera module 344.

The cores A, B, C, and D of the first core group 311 may be local cores of the storage device 341. The cores A, B, C, and D of the second core group 312, the third core group 313, and the fourth core group 314 may be remote cores of the storage device 341. As described with reference to the electronic device 100 of FIG. 1, a speed at which local cores access the storage device 341 may be faster than a speed at which remote cores access the storage device 341.

As described with reference to FIG. 4, the processor 310 may allocate a new process to local cores or remote cores, based on an IO requirement of the new process. As described with reference to FIGS. 5 to 11, the storage device 341 may report throughput to the processor 310 or may request switching of a local core and a remote core. Accordingly, the performance and reliability of the electronic device 300 may be improved.

In an embodiment, the terms "processor group" and "processors" are used in FIG. 1, and the terms "core group" and "cores" are used in FIG. 17. However, the terms are used to describe the present disclosure more easily, not intended to limit the score and spirit of the technical concept. For example, cores may be called "processors", and a core group may be called "a processor group". The terms "core" and "processor" may be used interchangeably.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to various embodiments, a storage device may transfer a signal to a host device depending on the amount of throughput used. Accordingly, a local processor or a remote processor may be allocated to the storage device depending on the amount of throughput usage of the storage device, and the used amount of throughput of the storage device may be optimized. Accordingly, a storage device capable of improving throughput efficiency and reducing latency, an operating method of the storage device, and an electronic device are provided.

While the present disclosure has been described with reference to various embodiments thereof, it will be apparent to those of ordinary skill in the art that various changes and modifications may be made thereto without departing from the spirit and scope of the present disclosure as set forth in the following claims.

What is claimed is:

1. A storage device comprising:
a nonvolatile memory device including a plurality of memory cells; and
a storage controller configured to access the nonvolatile memory device based on an input/output (IO) request of an external host device to read data from or to write data to the nonvolatile memory device,
wherein the storage controller sends a redistribution request signal to the external host device, based on a throughput of accessing the nonvolatile memory device being within a specific range.

2. The storage device of claim 1, wherein the redistribution request signal includes a local processor request that requests a local processor from the external host device, based on a non-uniform memory access (NUMA).

3. The storage device of claim 1, wherein the storage controller sends a report signal including information of the throughput, based on the throughput of accessing the nonvolatile memory device not being within the specified range.

4. The storage device of claim 1, wherein the redistribution request signal includes a message signaled interrupt (MSI) format defined in a peripheral component interconnect express (PCIe) standard.

5. The storage device of claim 1, wherein the storage controller periodically sends a second signal including information of the throughput to the external host device.

6. The storage device of claim 1, wherein the storage controller sends a second signal including information of the throughput to the external host device, based on a change in a range to which a value of the throughput belongs.

7. The storage device of claim 1, wherein the storage controller sends a second signal to the external host device based on a value of the throughput being less than a threshold value, and
wherein the threshold value is less than a lower value of the specific range.

8. The storage device of claim 1, wherein the specific range corresponds to a range from 60% to 70% of a maximum value of the throughput.

9. An operating method comprising:
accessing, at a storage controller, a nonvolatile memory device based on an input/output (IO) request of an external host device to read data from or to write data to the nonvolatile memory device;
monitoring, at the storage controller, a throughput of accessing the nonvolatile memory device; and
sending, from the storage controller, a redistribution request signal to the external host device based on the throughput being within a specific range.

10. The method of claim 9, further comprising:
sending, from the storage controller to the external host device, a report signal including information of the throughput based on the throughput not being within the specified range.

11. The method of claim 9, further comprising:
sending, from the storage controller to the external host device, a second signal including information of the throughput based on a change in a range to which a value of the throughput belongs.

12. The method of claim 9, further comprising:
sending, from the storage controller to the external host device, a signal based on a value of the throughput being less than a threshold value.

13. An electronic device comprising:
a first processor group including a plurality of first processors;
a second processor group including a plurality of second processors, the second processor group being configured to communicate with the first processor group; and a storage device connected with the second processor group, wherein the plurality of second processors directly access the storage device, wherein the plurality of first processors access the storage device through the plurality of second processors, and wherein, based on a throughput of the storage device being within a specific range, the storage device sends a redistribution request signal to a processor that accesses the storage device from among the plurality of first processors and the plurality of second processors.

14. The electronic device of claim 13, wherein, when an input and output (IO) requirement for the storage device necessary for a new process is less than a threshold value, the new process is executed by an idle processor that is in an idle state from among the plurality of first processors.

15. The electronic device of claim 13, wherein, when an input and output (IO) requirement for the storage device necessary for a new process is greater than a threshold value, the new process is executed by an idle processor that is in an idle state from among the plurality of second processors.

16. The electronic device of claim 15, wherein, when there is no idle processor that is in the idle state from among the plurality of second processors, the new process is executed by an idle processor that is in the idle state from among the plurality of first processors.

17. The electronic device of claim 13, wherein, when a process executed by at least one first processor of the plurality of first processors accesses the storage device, based on the redistribution request signal the process is switched to be executed by at least one second processor that is in an idle state from among the plurality of second processors.

18. The electronic device of claim 13, wherein, when a process executed by at least one second processor of the plurality of second processors accesses the storage device, the redistribution request signal is ignored.

19. The electronic device of claim 13, wherein the redistribution request signal includes a message signaled interrupt (MSI) format defined in a peripheral component interconnect express (PCIe) standard.

20. The electronic device of claim 13, wherein the plurality of first processors are implemented with multiple cores of a central processing unit, and the plurality of second processors are implemented with multiple cores of a central processing unit.

* * * * *